US012713308B2

(12) United States Patent
Chandrashekar et al.

(10) Patent No.: US 12,713,308 B2
(45) Date of Patent: Aug. 18, 2026

(54) TIMING ADVANCE MANAGEMENT DURING LAYER (L1/L2) TRIGGERED MOBILITY (LTM)

(71) Applicant: RAKUTEN MOBILE, INC., Tokyo (JP)

(72) Inventors: Subramanya Chandrashekar, Karnataka (IN); Koichiro Kitagawa, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 269 days.

(21) Appl. No.: 18/562,833

(22) PCT Filed: Sep. 28, 2023

(86) PCT No.: PCT/US2023/033977
§ 371 (c)(1),
(2) Date: Nov. 21, 2023

(87) PCT Pub. No.: WO2025/034226
PCT Pub. Date: Feb. 13, 2025

(65) Prior Publication Data

US 2025/0227570 A1 Jul. 10, 2025

(30) Foreign Application Priority Data

Aug. 8, 2023 (IN) ............................ 202341053113

(51) Int. Cl.
*H04W 36/00* (2009.01)
*H04W 56/00* (2009.01)
(Continued)

(52) U.S. Cl.
CPC ... *H04W 36/0077* (2013.01); *H04W 36/0058* (2018.08); *H04W 56/0045* (2013.01); *H04W 72/23* (2023.01); *H04W 74/0833* (2013.01)

(58) Field of Classification Search
CPC ......... H04W 36/0058; H04W 36/0072; H04W 36/0077; H04W 56/0045; H04W 72/23; H04W 74/0833
See application file for complete search history.

(56) References Cited

U.S. PATENT DOCUMENTS 9,885,711 B2 * 2/2018 White ................ G01N 33/6854
11,464,842 B1 * 10/2022 Gifford .......... A61K 39/001104
(Continued)

FOREIGN PATENT DOCUMENTS

GB 2637425 A * 7/2025 .......... H04W 36/087
GB 2639444 A * 9/2025 .......... H04W 72/231

OTHER PUBLICATIONS

Huawei et al., Timing advance management to reduce latency, Apr. 17, 2023, 3GPP TSG-RAN WG1 Meeting #112bis-e, Agenda Item: 9.10.2, Tdoc: R1-2302369 (Year: 2023).*
(Continued)

*Primary Examiner* — Eric Nowlin
(74) *Attorney, Agent, or Firm* — HAUPTMAN HAM, LLP

(57) ABSTRACT

The present disclosure describes techniques for timing advance management during layer (L1/L2) Triggered Mobility (LTM). In one aspect, a method comprises obtaining timing advances (TAs) for one or more LTM candidate cells based on indication from a serving gNB-DU and storing the obtained TAs and receiving LTM serving cell switch command to switch from a current serving cell to a target cell. The method further comprises transmitting, a list of candidate cell IDs and the stored TAs corresponding to the list of candidate cell IDs, to the target gNB-DU serving the target cell, in response to the successful completion of the LTM cell switch.

20 Claims, 10 Drawing Sheets

(51) Int. Cl.
*H04W 72/23* (2023.01)
*H04W 74/0833* (2024.01)

(56) References Cited

U.S. PATENT DOCUMENTS 12,401,400 B2 * 8/2025 Goyal ............... H04W 36/0058
12,452,744 B2 * 10/2025 Phuyal ............. H04W 36/0069
12,484,091 B2 * 11/2025 Ramachandra ..... H04W 36/085
12,563,463 B2 * 2/2026 Bai ....................... H04W 24/10
2019/0053184 A1 * 2/2019 Park ...................... H04L 5/0082
2023/0388871 A1 * 11/2023 Guo .................. H04W 36/0069
2023/0413139 A1 * 12/2023 Xu ........................ H04L 5/0094
2024/0162956 A1 * 5/2024 Goyal .................. H04B 7/0632
2024/0163745 A1 * 5/2024 Ramachandra ... H04W 36/0061
2024/0284373 A1 * 8/2024 Goyal ............... H04W 56/0045
2024/0292293 A1 * 8/2024 Bai ....................... H04W 24/10
2024/0340717 A1 * 10/2024 Karimidehkordi . H04W 36/324
2024/0340946 A1 * 10/2024 Karimidehkordi .......................... H04W 36/00725
2024/0340961 A1 * 10/2024 Akl ....................... H04W 36/08
2024/0340981 A1 * 10/2024 Karimidehkordi .......................... H04W 36/0072
2024/0373311 A1 * 11/2024 Bala .................. H04W 36/0058
2024/0388978 A1 * 11/2024 Phuyal ............. H04W 36/0069
2024/0422637 A1 * 12/2024 Akl ..................... H04W 36/362
2025/0071639 A1 * 2/2025 Hong ............. H04W 36/00835
2025/0071647 A1 * 2/2025 Hong .................. H04W 36/249
2025/0071648 A1 * 2/2025 Hong ................ H04W 36/0058
2025/0088926 A1 * 3/2025 Hong .................... H04W 36/08
2025/0106726 A1 * 3/2025 Wang ................ H04W 36/0072
2025/0167953 A1 * 5/2025 Guan ................... H04B 17/252
2025/0240682 A1 * 7/2025 Chandrashekar ............................ H04W 36/0085
2025/0317821 A1 * 10/2025 Yuan ..................... H04L 5/0098
2025/0351153 A1 * 11/2025 Go ........................ H04W 72/21
2025/0365594 A1 * 11/2025 Da Silva ............. H04B 17/328

OTHER PUBLICATIONS

Intel Corporation, On Timing Advance Management, Apr. 17, 2023, 3GPP TSG-RAN WG1 Meeting #112bis-e, Agenda Item: 9.10.2, Tdoc: R1-2302814 (Year: 2023).*

LG Electronics, Enhancements on TA management for mobility, Apr. 17, 2023, 3GPP TSG-RAN WG1 Meeting #112bis-e, Agenda Item: 9.10.2, Tdoc: R1-2303083 (Year: 2023).*

Interdigital, Inc., Discussion on timing advance management to reduce latency, Apr. 17, 2023, 3GPP TSG-RAN WG1 Meeting #112bis-e, Agenda Item: 9.10.2, Tdoc: R1-2303456 (Year: 2023).*

Google, Discussion on timing advance management to reduce latency, Apr. 17, 2023, 3GPP TSG-RAN WG1 Meeting #112bis-e, Agenda Item: 9.10.2, Tdoc: R1-2303519 (Year: 2023).*

NTT Docomo, Inc., Timing advance enhancement for inter-cell mobility, Apr. 17, 2023, 3GPP TSG-RAN WG1 Meeting #112bis-e, Agenda Item: 9.10.2, Tdoc: R1-2303728 (Year: 2023).*

Nokia et al., "Considerations on Cell Switch Triggering in Ltm", 3GPP TSG-RAN WG2 Meeting #121, Athens, Greece, Feb. 16, 2023, R2-2301412, 8pp.

Nokia et al., "Discussion on TA Acquisition for LTM", 3GPP TSG-RAN WG3#120, Incheon, Korea, May 11, 2023, R3-232673, 6pp.

* cited by examiner

TIMING ADVANCE MANAGEMENT DURING LAYER (L1/L2) TRIGGERED MOBILITY (LTM)

RELATED APPLICATIONS

The present application is a National Phase of International Application No. PCT/US2023/033977, filed Sep. 28, 2023, and claims priority based on Indian Patent Application number 202341053113, filed Aug. 8, 2023.

TECHNICAL FIELD

The present disclosure in general relates to methods and apparatus for timing advance management during Layer (L1/L2) Triggered Mobility (LTM).

BACKGROUND

The Fifth Generation (5G) New Radio (NR) is a wireless communication standard that defines a physical layer and a protocol stack for a fifth generation of mobile networks (5G). 5G NR operates on multiple frequency bands, allowing for wider coverage and higher data rates. Open Radio Access Networks (ORAN) are cloud-native, centralized cellular network architecture that provides great benefits in network scalability and performance. The Open RAN disaggregates traditional monolithic, single-vendor radio access networks (RAN) into a distributed unit (DU), centralized unit (CU) and radio unit (RU) and connects these elements using open standard interfaces. Disaggregation allows the operator to virtualize the CU and DU components and run them on commercial off the shelf (COTS) servers.

L1/L2 Triggered Mobility (LTM) is fundamentally different from the traditional or legacy Layer 3 Mobility in in terms of its execution. Layer 3 Mobility or the baseline mobility or legacy mobility concept, revolves around network configuring the User Equipment (UE) with RRC measurements or layer 3 measurements, and then the network using those measurements to prepare the target cells and subsequently sending handover command to the UE. The target cell configuration and the handover command are provided to instruct a Distributed Unit (DU) of a gNB to handover to the target cell. For LTM, a UE may be configured for lower layer mobility, such as Layer 1 (L1)/Layer 2 (L2) mobility, where the UE may perform lower layer handover procedures so that the UE may dynamically perform a cell switch handover procedure to a cell in the same or neighboring base station i.e. gNB.

In traditional cell switch or handover, the UE waits for Physical Random-Access Channel (PRACH) occasion and performs RACH to synchronize with the uplink (UL) of the target cell. This is necessary as the timing advance of the target cell (configured for HO) could be different from that of the serving cell. During the RACH procedure, the UE acquires the Timing Advance (TA) of the UE at the target cell.

For LTM, in order to reduce user-plane interruption time during cell switch, the UE can be ordered by the serving gNB-DU (before the LTM serving cell change) using a Physical Downlink Control Channel (PDCCH) order. The PDCCH order instructs the UE to perform UL sync operation with the indicated target gNB-DU cell. During this UL sync operation, the UE sends a Contention Free Random Access (CFRA) preamble to the target gNB-DU and procure the timing advance of the UE in the target cell. A Random-Access Response (RAR) of the target gNB-DU can be configured to include the target cell TA for the UE. The benefit of such procedure is that the UE can avoid performing RACH during the actual LTM serving cell change, as the target cell TA is already available and hence may reduce HO latency and hence user plane interruption as well.

If the UE receives LTM cell switch command from the serving DU to perform LTM cell switch to a target cell of the target DU. The UE gets handed over to the target DU. The target DU may act as new serving DU. Even though the UE may have successfully acquired TA of one or more candidate cells prior to handover, the new serving DU is unaware of the TAs acquired by the UE and TAs stored within the UE.

This may result in expiry of a TA alignment timer defined for respective timing advance and loss of TA awareness at the UE. Further, new serving DU may instruct the UE to clear the TAs stored at UE and may instruct the UE to perform UL sync with candidate cells again, which impacts UE's data transmission at the new serving gNB-DU and may be an overhead for the new serving gNB-DU as well. Also, the new serving DU may instruct the UE to perform RACH-based HO at the time of issuing the LTM cell switch command, thereby taking away all the planned benefits of RACH-less HO and increasing the HO latency.

Therefore, there exists a need in the art to provide a technique/mechanism which overcomes the above-mentioned problems by providing timing advance management during L1/L2 centric inter-cell change.

SUMMARY

During L1/L2 centric inter-cell change (i.e., change of serving cell) in the disaggregated gNB architecture, one of the key objectives is to enable a RACH-less cell switch from source to target cell. The expiry of timing advance (TA) alignment timer leads to loss of TA awareness at the user equipment (UE). Due to expiry of the TA alignment timer, the UE needs to perform Random Access Channel (RACH) procedure-based cell switch at the time of Layer (L1/L2) Triggered Mobility (LTM) serving cell switch command, thereby increasing the cell switch latency. In absence of TA awareness at the serving gNB-DU, if a RACH-less LTM cell switch is desired, the serving gNB-DU may instruct the UE to perform UL sync procedure with the target gNB-DU cell again and acquire the updated TA that interrupts UE's data transmission at the serving gNB-DU and becomes an overhead for the target gNB-DU as well.

In one non-limiting aspect of the present disclosure, a method for timing advance management during layer (L1/L2) triggered mobility (LTM) event is disclosed. The method discloses UE obtaining timing advances (TAs) for one or more LTM candidate cells based on indication from a serving gNB-DU and storing the obtained TAs. The method further discloses receiving LTM serving cell switch command to switch from a current serving cell to a target cell. The current serving cell is served by a serving gNodeB Distributed Unit (gNB-DU) and the target cell is served by a target gNB-DU. Finally, the method discloses transmitting, a list of candidate cell IDs and the stored TAs corresponding to the list of candidate cell IDs, to the target gNB-DU, serving the target cell, in response to the successful completion of the LTM cell switch.

In another non-limiting aspect of the present disclosure, an apparatus for timing advance management during layer (L1/L2) triggered mobility (LTM) event is disclosed. The apparatus comprising at least one processor and a memory communicatively coupled to the at least one processor. The memory is configured to store processor-executable instructions, which, on execution, cause the at least one processor to obtain timing advances (TAs) for one or more LTM candidate cells based on indication from a serving gNB-DU and store the obtained TAs. The stored processor-executable instructions, upon execution, further cause the at least one processor to receive Layer LTM serving cell switch command to switch from a current serving cell to a target cell. The current serving cell is served by a serving gNodeB Distributed Unit (gNB-DU) and the target cell is served by a target gNB-DU. The stored processor-executable instructions, upon execution, further cause the at least one processor to transmit, a list of candidate cell IDs and the stored TAs corresponding to the list of candidate cell IDs, to the target gNB-DU serving the target cell, in response to the successful completion of the LTM cell switch.

In yet another non-limiting aspect of the present disclosure, a non-transitory computer-readable medium for timing advance management during layer (L1/L2) triggered mobility (LTM) event is disclosed. The non-transitory computer-readable medium having computer-readable instructions that when executed by a processor causes the processor to perform operations of obtaining timing advances (TAs) for one or more LTM candidate cells based on indication from a serving gNB-DU and storing the obtained TAs. The computer-readable instructions when executed by the processor further causes the processor to perform operation of obtaining LTM serving cell switch command to switch from a current serving cell to a target cell. The current serving cell is served by a serving gNodeB Distributed Unit (gNB-DU) and the target cell is served by a target gNB-DU. The computer-readable instructions when executed by a processor finally causes the processor to perform operation of transmitting, a list of candidate cell IDs and the stored TAs corresponding to the list of candidate cell IDs, to the target gNB-DU serving the target cell, in response to the successful completion of the LTM cell switch.

In yet another non-limiting aspect of the present disclosure, a method for timing advance management during layer (L1/L2) triggered mobility (LTM) event is disclosed. The method discloses receiving a list of candidate cell IDs and corresponding timing advances (TAs) from a user equipment (UE). The method further discloses executing Layer (L1/L2) Triggered Mobility (LTM) cell switch of the UE from a current serving cell to a target cell. The current serving cell is served by a serving gNodeB Distributed Unit (gNB-DU) and the target cell is served by a target gNB-DU. Finally, the method discloses transmitting, the list of candidate cell IDs and the corresponding TAs, to the target gNB-DU serving the target cell, in response to the execution of the LTM cell switch.

In another non-limiting aspect of the present disclosure, an apparatus for timing advance management during layer (L1/L2) triggered mobility (LTM) event is disclosed. The apparatus comprising at least one processor and a memory communicatively coupled to the at least one processor. The memory stores processor-executable instructions, which, on execution, cause the at least one processor to receive a list of candidate cell IDs and corresponding timing advances (TAs) from a user equipment (UE). The stored processor-executable instructions, upon execution, further cause the at least one processor to execute Layer (L1/L2) Triggered Mobility (LTM) cell switch of the UE from a current serving cell to a target cell. The current serving cell is served by a serving gNodeB Distributed Unit (gNB-DU) and the target cell is served by a target gNB-DU. The stored processor-executable instructions, upon execution, finally cause the at least one processor to transmit, the list of candidate cell IDs and the corresponding TAs, to the target gNB-DU serving the target cell, in response to the execution of the LTM cell switch.

In yet another non-limiting aspect of the present disclosure, a non-transitory computer-readable medium for timing advance management during layer (L1/L2) triggered mobility (LTM) event is disclosed. The non-transitory computer-readable medium having computer-readable instructions that when executed by a processor causes the processor to perform operations of obtaining a list of candidate cell IDs and corresponding timing advances (TAs) from a user equipment (UE). The computer-readable instructions when executed by the processor further cause the processor to perform operation of executing Layer (L1/L2) Triggered Mobility (LTM) cell switch of the UE from a current serving cell to a target cell. The current serving cell is served by a serving gNodeB Distributed Unit (gNB-DU) and the target cell is served by a target gNB-DU. The computer-readable instructions when executed by the processor finally causes the processor to perform operation of transmitting, the list of candidate cell IDs and the corresponding TAs, to the target gNB-DU serving the target cell, in response to the execution of the LTM cell switch.

The foregoing summary is illustrative only and is not intended to be in any way limiting. In addition to the illustrative aspects, aspects, and features described above, further aspects and features will become apparent by reference to the drawings and the following detailed description.

BRIEF DESCRIPTION OF DRAWINGS

Further aspects and advantages of the present disclosure will be readily understood from the following detailed description with reference to the accompanying drawings. Reference numerals have been used to refer to identical or functionally similar elements. The figures together with a detailed description below, are incorporated in and form part of the specification, and serve to further illustrate the aspects and explain various principles and advantages, in accordance with the present disclosure wherein.

Figure 1:
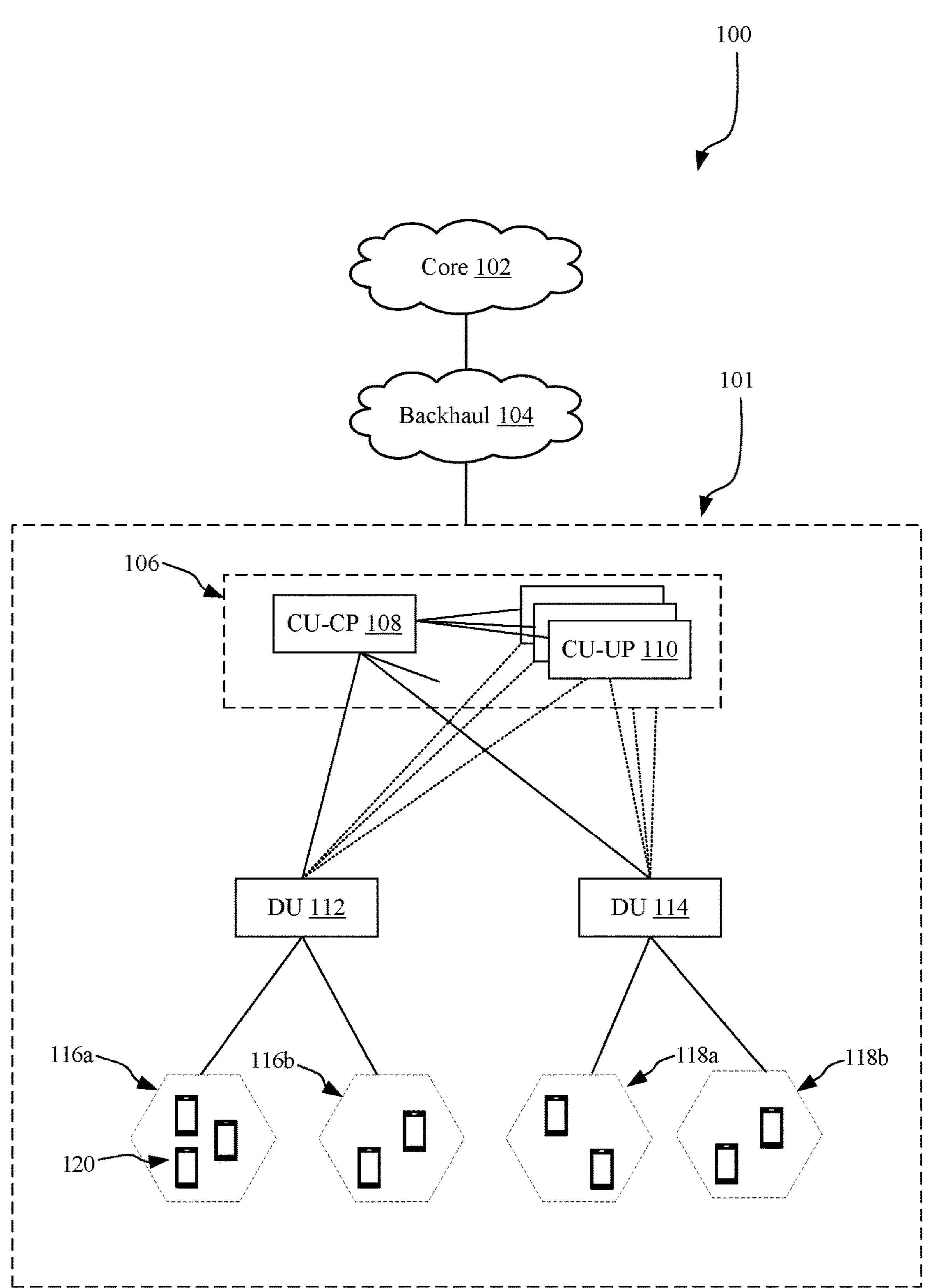
FIG. 1 shows an exemplary aspect of Radio Access Network (RAN) communication system 100 with disaggregated gNB architecture, in accordance with some aspects of the present disclosure.

It should be appreciated by those skilled in the art that any block diagrams herein represent conceptual views of the illustrative systems embodying the principles of the present disclosure. Similarly, it will be appreciated that any flow-charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any aspect or implementation of the present disclosure described herein as "exemplary" is not necessarily to be construed as preferred or advantageous over other aspects.

While the disclosure is susceptible to various modifications and alternative forms, specific aspects thereof have been shown by way of example in the drawings and will be described in detail below. It should be understood, however, that it is not intended to limit the disclosure to the particular form disclosed, but on the contrary, the disclosure is to cover all modifications, equivalents, and alternatives falling within the spirit and the scope of the disclosure.

The terms "comprise(s)", "comprising", "include(s)", or any other variations thereof, are intended to cover a non-exclusive inclusion, such that a setup, device, apparatus, system, or method that comprises a list of components or steps does not include only those components or steps but may include other components or steps not expressly listed or inherent to such setup or device or apparatus or system or method. In other words, one or more elements in a device or system or apparatus preceded by "comprises . . . a" does not, without more constraints, preclude the existence of other elements or additional elements in the system.

The terms like "at least one" and "one or more" may be used interchangeably throughout the description. The terms like "a plurality of" and "multiple" may be used interchangeably throughout the description. The terms like "distributed unit", "distributed unit entity", "DU", and "vDU" may be used interchangeably throughout the description. The terms like "central unit control plane", "CU-CP", "CU-CP entity", and "vCU-CP" may be used interchangeably throughout the description. The terms like "central unit user plane", "CU-UP", "CU-UP entity" and "vCU-UP" may be used interchangeably throughout the description.

The terms like "COTS" and "commercial off the shelf server" may be used interchangeably throughout the description. The terms like "network operator", "operator", and "service provider" may be used interchangeably throughout the description. The terms like "L1/L2 triggered mobility" and "LTM" may be used interchangeably throughout the description. The terms like "Timing Advance" and "TA" may be used interchangeably throughout the description. The terms like "Timing Advance Alignment Timer", "Time_Alignment_Timer", and "TA Alignment Timer" may be used interchangeably throughout the description. The terms "cell switch" and "handover" may be used interchangeably throughout the description. The terms like "MAC control element" and "MAC CE" may be used interchangeably throughout the description. It is to be appreciated that the interchangeable terms disclosed in foregoing paragraphs may be used repeatedly throughout the disclosure. However, the same shall not be construed limiting the scope of the present disclosure in any sense.

In the following detailed description of the aspects of the disclosure, reference is made to the accompanying drawings that form a part hereof, and in which are shown by way of illustration of specific aspects in which the disclosure may be practiced. These aspects are described in sufficient detail to enable those skilled in the art to practice the disclosure, and it is to be understood that other aspects may be utilized and that changes may be made without departing from the scope of the present disclosure. The following description is, therefore, not to be taken in a limiting sense. In the following description, well known functions or constructions are not described in detail since they would obscure the description with unnecessary detail.

The disaggregated architecture of gNB as defined in 3GPP decomposes the gNB into multiple logical entities such as one or more CUs and one or more DUs. Likewise, a single DU may host multiple cells (max of 512 in current specifications). The CU may be further partitioned into a control-plane entity (CU-CP) and one or more user-plane entities (CU-UPs). The gNB-CU-CP hosts the Packet Data Convergence Protocol (PDCP) and Radio Resource Control (RRC) layers, while the gNB-DU hosts the Radio link Control (RLC)/Media Access Control (MAC) and Physical (PHY) layers. The scheduling operation takes place at the gNB-DU.

When the UE moves from the coverage area of one cell to another cell, at some point a serving cell change needs to be performed. Currently serving cell change is triggered by L3 measurements and is done by RRC signaling triggered reconfiguration with synchronization for cell change, when applicable. In such scenario, complete L2 and L1 get reset. Complete L2/L1 reset means full change in L1, L2 configuration of the cell at the UE. This leads to longer latency, larger overhead, and longer interruption time than beam switch mobility.

In this regard, 3rd Generation Partnership Project (3GPP) continues to add functionality in Release 18 to enhance 5G performance by working in the areas of network energy savings, coverage, mobility support, MIMO evolution, multicast and broadcast service (MBS), and positioning. The objectives of the mobility enhancement Release 18 work item is to specify mechanism and procedures of L1/L2 based inter-cell mobility for mobility latency reduction. The L1/L2 mobility enhancements have been proposed to enable a serving cell change via L1/L2 signaling, in order to reduce the latency, overhead, and interruption time. Those skilled in the art will appreciate that L1/L2-triggered mobility (LTM) is a procedure in which a gNB receives L1 measurement reports from UEs, and on their basis the gNB changes UEs' serving cell(s) through MAC CE. The L1 measurement involves Inter cell beam forming (ICBM), which does not require complete L2/L1 reset. The gNB prepares one or multiple candidate cells and provides the candidate cell configurations to the UE through RRC message. Then, LTM cell switch is triggered, by selecting one of the candidate configurations as target configuration for LTM by the gNB.

The candidate cell configurations can only be added, modified, and released by network via RRC signaling.

In traditional cell switch or handover, the UE waits for Physical Random Access Channel (PRACH) occasion and performs RACH to synchronize with the uplink (UL) of the target cell. This is necessary as the timing advance of the target cell (configured for HO) could be different from that of the serving cell. During the RACH procedure, the UE acquires the Timing Advance (TA) of the UE at the target cell. The TA is UE-specific and could be different for different UEs in a cell, depending on the distance from the base station. Timing advance is defined as a negative offset, at the UE, which exists between the start of a received downlink subframe and a transmitted uplink subframe. This offset at the UE is necessary to ensure that the downlink and uplink subframes are synchronized at the gNB. The gNB controls Timing Advance that each UE has to apply. The gNB provides the UE with a configurable timer called Time_Alignment_Timer. Time_Alignment_Timer is used to control how long the UE is considered uplink time aligned. The UE starts/restarts the Time_Alignment_Timer based on the condition when it received the Timing Advance Command. The UE shall not perform any uplink transmission except the Random Access Preamble transmission when Time_Alignment_Timer is not running.

For LTM, in order to reduce user-plane interruption time during HO, it has been agreed in RAN1 that the UE can be ordered by the serving gNB-DU (before the LTM serving cell change) using a Physical Downlink Control Channel (PDCCH) order. The PDCCH order instructs the UE to perform UL sync operation with the indicated target gNB-DU cell. During this UL sync operation, the UE sends a Contention Free Random Access (CFRA) preamble (either reserved during LTM target cell preparation or made available later) to the target gNB-DU and procure the timing advance of the UE in the target cell. A Random Access Response (RAR) of the target gNB-DU can be configured to include the target cell TA for the UE. The benefit of such procedure is that the UE can avoid performing RACH during the actual LTM serving cell change, as the target cell TA is already available and hence may reduce HO latency and hence user plane interruption as well.

Hence, in order to support L1/L2 centric inter-cell change (i.e. change of serving cell) in the disaggregated gNB architecture, a new mechanism is needed in which the HO preparation i.e., preparation of target cell configuration would take place at the gNB-CU-CP, but executed autonomously by the gNB-DU without further interaction with the upper layers for further improving the HO latency.

In one non-limiting aspect of the present disclosure, a method of timing advance management during L1/L2 centric inter-cell change is disclosed. The method includes obtaining timing advances (TAs) for one or more Layer (L1/L2) Triggered Mobility (LTM) candidate cells based on indication from a serving gNB-DU and storing the obtained TAs, and receiving Layer (L1/L2) Triggered Mobility (LTM) serving cell switch command to switch from a current serving cell to a target cell. The current serving cell is served by a serving gNodeB Distributed Unit (gNB-DU) and the target cell is served by a target gNB-DU. The method further includes transmitting, a list of candidate cell IDs and the stored TAs corresponding to the list of candidate cell IDs, to the target gNB-DU serving the target cell, in response to the successful completion of the LTM cell switch. The transmission of the list of candidate cell IDs and the stored TAs corresponding to the list of candidate cell IDs to the target gNB-DU serving the target cell facilitates the target gNB-DU to re-use the TA timers, wherever required. The list of candidate cell IDs and the TAs also facilitates the target gNB-DU to initiate UL sync in the correct cells without repeating the RACH procedure and without negotiating UE's data transmission at the target gNB-DU. Further, the above solution ensures RACH less HO during subsequent inter-cell change as well.

To understand the above solution in detail, one first needs to understand the disaggregated gNB architecture discussed in detail below with reference to FIG. 1. FIG. 1 which shows an exemplary aspect of radio access network (RAN) communication system 100 comprising a 5G New Radio (NR) base station system (also referred to as a "gNodeB" or "gNB") 101, in accordance with some aspects of the present disclosure. Although FIG. 1 is described in the context of a 5G architecture in which the base station is partitioned into multiple logical entities, it is to be understood that the techniques described here can be used with other wireless interfaces for example, 4G LTE. In an exemplary aspect, the gNB 101 may be configured to provide wireless services to the at least one user equipment (UE) 120 present in cells 116*a*, 116*b*, 118*a*, or 118*a* served by the gNB 101. However, the number of cells is not limited to the above example and gNB 101 may comprise more cells than discussed in above example.

The at least one UE may be any mobile or non-mobile computing device including, but not limited to, a phone (e.g., a cellular phone or smart phone), a pager, a laptop computer, a desktop computer, a wireless handset, a portable communication device, a portable computing device (e.g., a personal data assistant), an entertainment device (e.g., a music or video device, or a satellite radio), a global positioning system device, or any other suitable computing device including a wired or wireless communications interface. In some aspects of the present disclosure, the at least one UE may be Internet-of-Things (IoT)-enabled device including, but not limited to, vehicles configured to communicate with the gNB 101 or a core network.

As shown, the gNB 101 may be partitioned into a central unit (CU) 106 and one or more distributed units (DUs) 112 and 114. In such a configuration, the CU is configured to serve the DU 112 and DU 114, and the DUs 112 and 114 are configured to serve the one or more UE 120. In the aspect of FIG. 1, the CU 106 may be further partitioned into a control-plane entity (CU-CP) 108 and one or more user-plane entities (CU-UPs) 110 that may handle the control-plane and user-plane processing of the CU 106, respectively. The CU-CP 108 is communicatively coupled with each of the CU-UPs 110 via an E1 interface. The CU-CP 108 is communicatively coupled with each of the DUs 112 and 114 via an F1-C interface. Each of the DUs 112 and 114 may be communicatively coupled to each of the CU-UPs 110 via an F1-U interface.

In one non-limiting aspect, the CU and DU functions may run as virtual software functions on standard commercial off-the-shelf (COTS) server. In such a case, the CU-CP entity 108 may also be referred to as a "vCU-CP" 108 and each such user-plane CU entity 110 may also be "vCU-UP" 110. The vCU-CP 108 and vCU-UP 110 entities may be interconnected through an interface specified by the relevant 3GPP 5G NR Technical Specifications. The vCU-CP 108 and vCU-UP entity 110 may be communicatively coupled with virtual DUs (vDUs) such a vDU 112 and vDU 114 via an interface known to a person skilled in the art. In one non-limiting aspect, each of the virtual DUs 112 and 114 may be hosted a COTS server.

In such an example, the CU-CP 108 and vCU-UP entity 110 may be configured to communicate with a core network 102 of an associated wireless operator using an appropriate backhaul network 104 (typically, a public wide area network such as the Internet). In one non-limiting aspect of the present disclosure, the core network 102 may be a 5G core network in a standalone mode of deployment. The 5G core network may utilize cloud-aligned, service-based architecture that spans across all 5G functions and interactions including authentication, security, session management etc. The 5G core network may further emphasize network function virtualization (NFV) as an integral design concept with virtualized software functions.

In another non-limiting aspect, the core network 102 may be a long-term evolution evolved packet core (LTE EPC) network in a non-standalone mode of deployment where services are provided using previous generation infrastructure (e.g., using existing LTE Evolved Packet Core (EPC)). In non-standalone deployment, an interface S1 may exist between the gNB 101 and the LTE EPC. The present disclosure may also be applicable for standalone and/or non-standalone modes of deployments or other modes of deployments which may be developed in the future.

In one implementation (as shown in FIG. 1), the DU 112 may be serving the UE 120 present in the cells 116*a* and 116*b*, and DU 114 may be serving the UE 120 present in the cells 118*a* and 118*b*. Each UE 120 may be communicatively coupled to a respective DU 112 and 114, which is serving it via a fronthaul network which may comprise a private network, and/or the Internet, but not limited thereto.

As shown in FIG. 1, the disaggregated architecture of gNB 101 shows that the DU 112 and DU 114 have respective cell coverage defined by cells 116*a*, 116*b* and 118*a*, 118*b*, respectively. The intra gNB-DU mobility may be defined as cell switch of a UE 120 from one cell to another cell of the same DU. The inter gNB-DU mobility may be defined as cell switch of a UE 120 between cells of different gNB DUs. The intra gNB-DU mobility and the inter gNB-DU mobility is discussed in detail in below aspects.

Figure 2A:
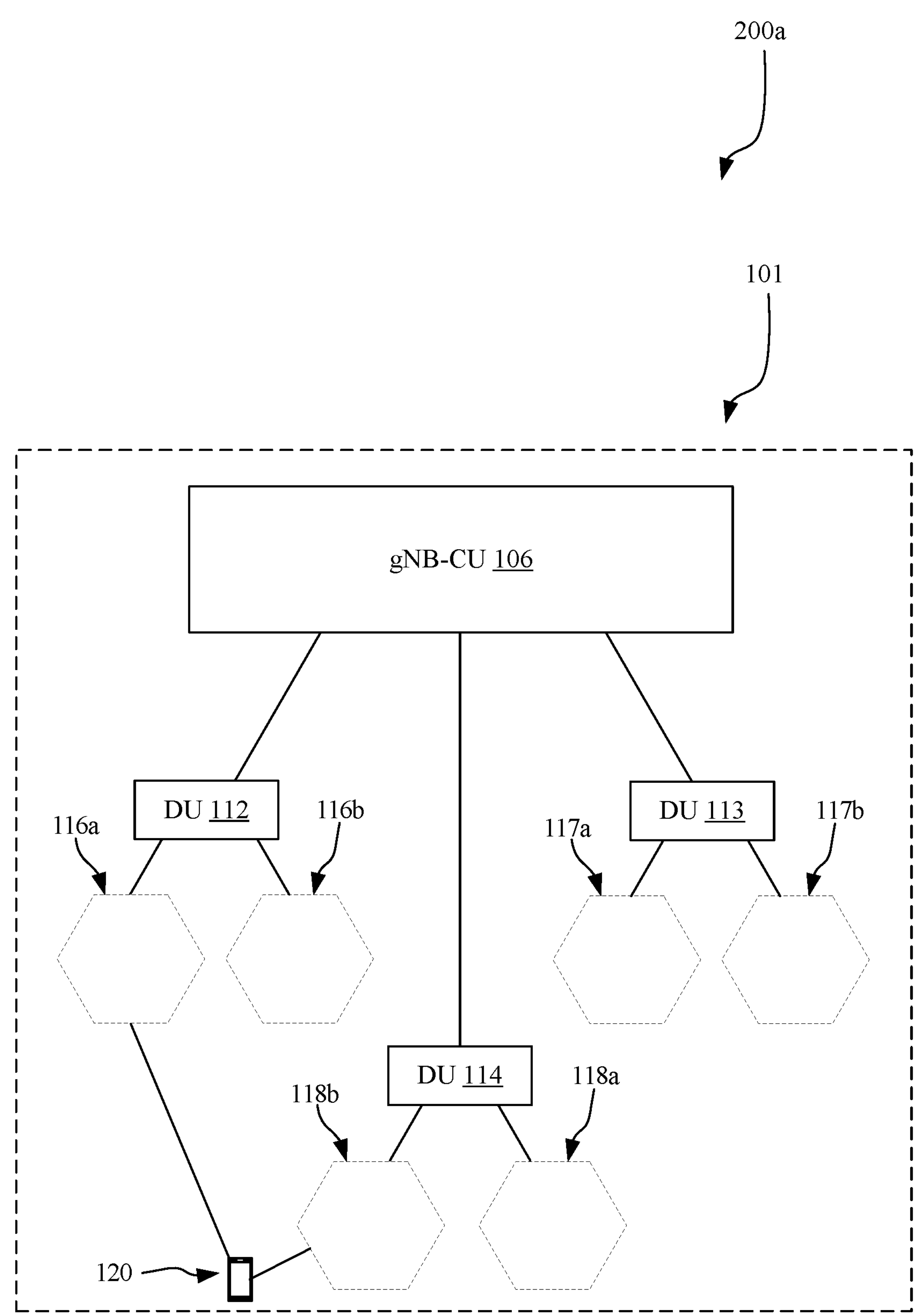
FIG. 2A illustrates a high-level block diagram 200*a* showing intra gNB-DU mobility, in accordance with some aspects of the present disclosure.

Referring now to FIG. 2A that illustrates a high-level block diagram 200*a* showing intra gNB-DU mobility, in accordance with an aspect of present disclosure. The gNB-CU 106 may have DU 112, DU 113, and DU 114 connected to it. Considering the UE 120 is currently served by serving cell 116*a* of the serving DU 112. The cells 116*b*, 117*a*, 117*b*, 118*a*, and 118*b* may act as candidate cells, the configuration of which may be defined using RRC configuration message received by the UE 120. The candidate cells 116*b*, 117*a*, 117*b*, 118*a*, and 118*b* may be served by candidate DUs 113 and 114.

The serving DU 112 may instruct the UE 120 to perform UL Sync using PDCCH order with the candidate cell 117*a* of the candidate DU 113 and the candidate cell 118*b* of the candidate DU 114 by performing a RACH procedure and transmitting the RACH Preamble to the candidate DUs 113 and 114. The UE 120 may then receive Random Access Response (RAR) comprising the Timing Advance (TAs) of respective candidate cells 117*a* and 118*b* from the candidate DU 113 and the candidate DU 114, respectively. This RAR message may be received directly from the target gNB-DU or via the gNB-CU and the serving gNB-DU. The UE 120 may store the respective TAs of the respective candidate cells 117*a* and 118*b* based on a Timing Advance Alignment Timer defined for the respective timing advance. The maximum number of TA values memorized by UE is dependent on UE capability.

If the serving DU 112 instructs the UE 120 to perform UL sync using PDCCH order with the candidate cell 117*b* and while performing the UL sync with the candidate DU 113, the UE 120 receives LTM cell switch command from the serving DU 112 to perform LTM cell switch to target cell 118*b* of the target DU 114. Due to the higher priority of the LTM cell switch command, the LTM cell switch is executed on priority and the UE 120 gets handed over to the target DU 114. The target DU 114 may act as new serving DU. Even though the UE may successfully acquire TA of candidate cell 117*b*, the new serving DU 114 is unaware of the TAs acquired by the UE 120 and TAs stored within the UE 120.

This may result in expiry of a TA alignment timer defined for respective timing advance and loss of TA awareness at the UE 120. Further, new serving DU 114 may instruct the UE 120 to clear the TAs stored at UE 120 and may instruct the UE to perform UL sync with candidate cells again, which impacts UE's data transmission at the new serving gNB-DU 114 and may be an overhead for the new serving gNB-DU 114 as well. Also, the new serving DU 114 may instruct the UE 120 to perform RACH-based HO at the time of issuing the LTM cell switch command, thereby taking away all the planned benefits of RACH-less HO and increasing the HO latency.

In an aspect, the present disclosure solves the above problems by transmitting a list of all the candidate cell IDs to which UL sync has been performed by the UE 120 earlier (TAs maintained) along with their corresponding timing advances to the new serving gNB-DU 114, whenever an LTM serving cell switch command is detected/executed. The list of candidate cell IDs and the TAs corresponding to the list of candidate cell IDs can be communicated from the UE 120 to the new serving DU 114 through an UL MAC control element (CE) or a similar Layer 1/2 command.

In another aspect, the present disclosure solves the above problem by transmitting a list of all the candidate cell IDs to which UL sync has been performed by the UE 120 along with their corresponding timing advances from the old serving gNB-DU 112 to the new serving gNB-DU 114, after execution of LTM cell switch. The list of candidate cell IDs and the TAs corresponding to the list of candidate cell IDs may be received by old serving gNB-DU 112 from the UE 120 as and when they are acquired from the respective candidate cells. The list of candidate cell IDs and the TAs corresponding to the list of candidate cell IDs may be communicated to the new serving DU 114 directly or through gNB-CU 106 over the F1 interface.

Thus, the above mentioned two solutions of the present disclosure facilitates the new serving gNB-DU 114 to re-use the TA timers received from the old serving gNB-DU 112, wherever required. The list of candidate cell IDs and the TAs facilitates the new serving gNB-DU 114 to initiate UL sync in the correct cells without having the need to repeat the RACH procedure and without negotiating UE's data transmission at the new serving gNB-DU 114. Further, the above discussed solutions ensure RACH less HO during LTM inter-cell change.

Figure 2B:
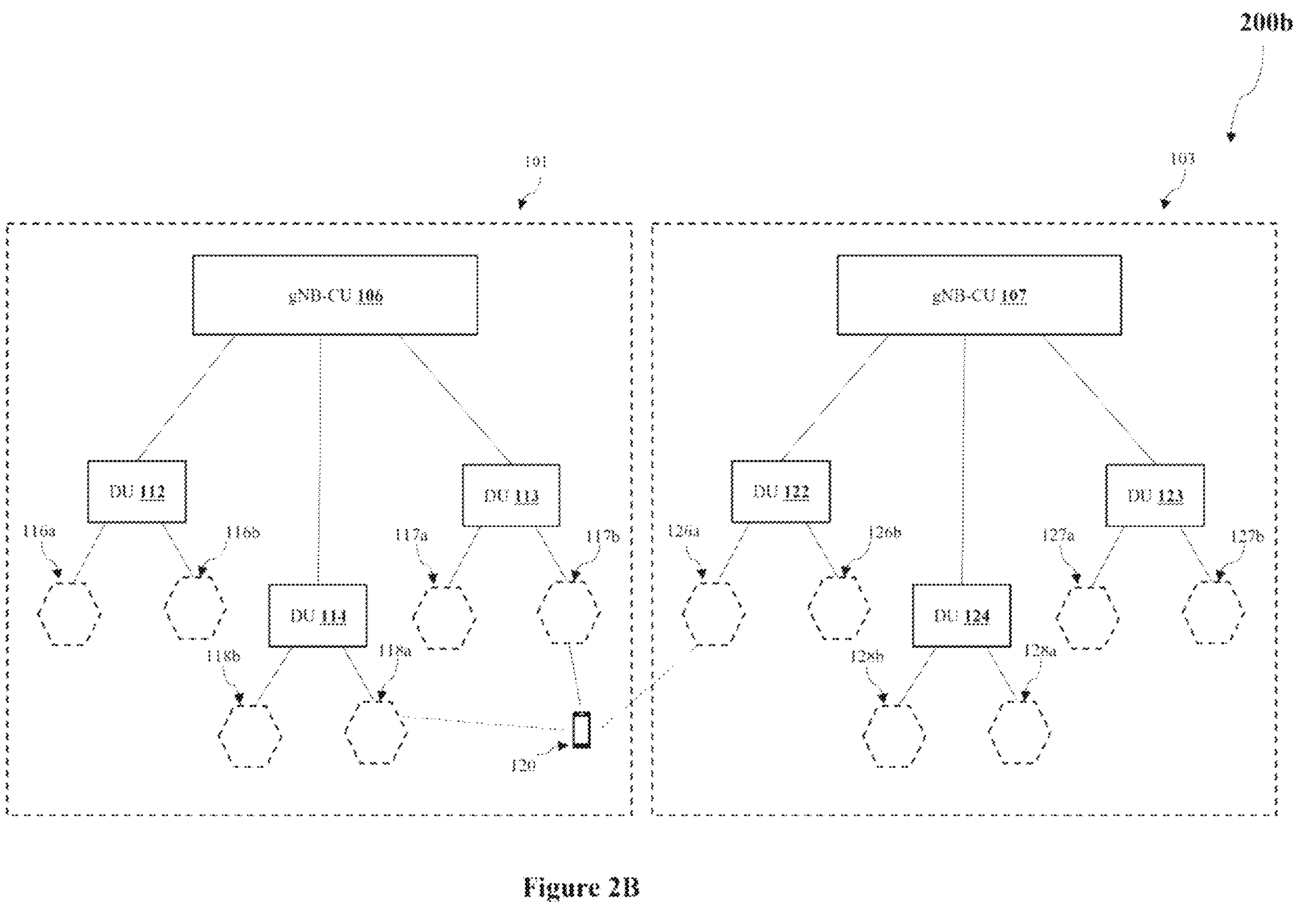
FIG. 2B illustrates a high-level block diagram 200*b* showing inter gNB-DU mobility, in accordance with some aspects of the present disclosure.

Referring now to FIG. 2B that illustrates a high-level block diagram 200*b* showing inter gNB-DU mobility, in accordance with an aspect of present disclosure. The gNB-CU 106 of a gNB 101 may have DU 112, DU 113, and DU 114 connected to it. Similarly, the gNB-CU 107 of gNB 103 may have DU 122, DU 123, and DU 124 connected to it Considering the UE 120 is currently served by serving cell 117*b* of the serving DU 113. For intra gNB-DU mobility, the cells 116*a*, 116*b*, 117*a*, 118*a*, and 118*b* may act as candidate cells, which may be defined using RRC configuration message received by the UE 120. The candidate cells 116*a*, 116*b*, 117*a*, 118*a*, and 118*b* may be served by candidate DUs 112, 113 and 114. Similarly, for inter gNB-DU mobility, the cells 126*a*, 126*b*, 127*a*, 127*b*, 128*a*, and 128*b* may act as candidate cells, which may be defined using RRC configuration message received by the UE 120. The candidate cells 126*a*, 126*b*, 127*a*, 127*b*, 128*a*, and 128*b* may be served by candidate DUs 122, 123, and 124 respectively.

The serving DU 113 may instruct the UE 120 to perform UL Sync using PDCCH order with the candidate cell 126*a* of the candidate DU 122 and the candidate cell 128*b* of the candidate DU 124 by transmitting the RACH Preamble to the candidate DUs 122 and 124. The UE 120 may then receive Random Access Response (RAR) comprising the Timing Advance (TAs) of respective candidate cells 126*a* and 128*b* from the candidate DU 122 and the candidate DU 124, respectively. The UE 120 may store the respective TAs of the respective candidate cells 126*a* and 128*b* based on a Time Advance Alignment Timer defined for the respective timing advance. Once again, it is to be appreciated that the maximum number of TA values memorized by UE is dependent on UE capability.

If the serving DU 113 instructs the UE 120 to perform UL sync using PDCCH order with the candidate cell 127*b* and while performing the UL sync with the candidate DU 123, the UE 120 receives LTM cell switch command from the serving DU 113 to perform LTM cell switch to target cell 126*a* of the target DU 122. Due to the higher priority of the LTM cell switch command, the LTM cell switch is executed on priority and the UE 120 gets handed over to the target DU 122. The target DU 122 may act as new serving DU. Even though the UE may successfully acquire TA of candidate cell 127*b*, the new serving DU 122 is unaware of the TAs acquired by the UE 120 and TAs stored within the UE 120.

This results in expiry of the TA alignment timer defined for respective timing advance and loss of TA awareness at the UE 120. Further, new serving DU 122 may instruct the UE 120 to clear the TAs stored at UE 120 and may instruct the UE to perform UL sync with candidate cells 128*b* and 127*b* again, which impacts UE's data transmission at the new serving gNB-DU 122 and may be an overhead for the new serving gNB-DU 122 as well. Also, the new serving DU 122 may instruct the UE 120 to perform RACH-based HO at the time of issuing the LTM cell switch command, thereby taking away all the planned benefits of RACH-less HO and increasing the HO latency.

In an aspect, the present disclosure solves the above problem by transmitting a list of all the candidate cell IDs to which UL sync has been performed by the UE 120 earlier (TAs maintained) along with their corresponding timing advances to the new serving gNB-DU 122, whenever an LTM serving cell switch command is detected/executed. The list of candidate cell IDs and the TAs corresponding to the list of candidate cell IDs can be communicated from the UE 120 to the new serving DU 122 through an UL MAC control element (CE) or a similar L1/L2 command.

In another aspect, the present disclosure solves the above problem by transmitting a list of all the candidate cell IDs to which UL sync has been performed by the UE 120 along with their corresponding timing advances from the old serving gNB-DU 113 to the new serving gNB-DU 122, after execution of LTM cell switch. The list of candidate cell IDs and the TAs corresponding to the list of candidate cell IDs may be received by old serving gNB-DU 113 from the UE 120 as and when they are acquired from the respective candidate cells. The list of candidate cell IDs and the TAs corresponding to the list of candidate cell IDs may be communicated to the new serving DU 122 through gNB-CU 106 and gNB-CU 107. In another aspect, the old serving gNB 113 and the new serving gNB 122 could be served by the same gNB-CU 106.

Thus, the above discussed solutions of the present disclosure facilitates the new serving gNB-DU 122 to re-use the TA timers received from the old serving gNB-DU 113, wherever required. The list of candidate cell IDs and the TAs facilitates the new serving gNB-DU 122 to initiate UL sync in the correct cells without repeating the RACH procedure and without negotiating UE's data transmission at the new serving gNB-DU 122. Further, the above mentioned two solutions ensure RACH less HO during inter-cell change. To understand the solutions discussed in foregoing paragraphs is detail, reference may be made to FIGS. 3A and 3B discussed in detail in forthcoming paragraphs.

In another exemplary aspect of the present disclosure, the serving DU 113 may instruct the UE 120 to perform LTM cell switch command from the serving DU 113 to perform LTM cell switch to target cell 118*a* of the target DU 114 of the same gNB 101. The UE 120 gets handed over to the target DU 114. The target DU 114 may act as new serving DU.

As per the above mentioned solution, the UE 120 may transmit a list of all the candidate cell IDs to which UL sync has been performed by the UE 120 earlier (TAs maintained) along with their corresponding timing advances to the new serving gNB-DU 114, whenever an LTM serving cell switch is successfully completed. The list of candidate cell IDs and the TAs corresponding to the list of candidate cell IDs can be communicated from the UE 120 to the new serving DU 114 through an UL MAC control element (CE) or a similar L1/L2 command.

Alternatively, the UE 120 may transmit a list of all the candidate cell IDs to which UL sync has been performed by the UE 120 along with their corresponding timing advances from the old serving gNB-DU 113 to the new serving gNB-DU 114, after execution of LTM cell switch. The list of candidate cell IDs and the TAs corresponding to the list of candidate cell IDs may be received by old serving gNB-DU 113 from the UE 120 as and when they are acquired from the respective candidate cells. The list of candidate cell IDs and the TAs corresponding to the list of candidate cell IDs may be communicated to the new serving DU 114 through gNB-CU 106.

Thus, the above discussed solutions of the present disclosure facilitates the new serving gNB-DU 114 to re-use the TA timers received from the old serving gNB-DU 113, wherever required. The list of candidate cell IDs and the TAs facilitates the new serving gNB-DU 114 to initiate UL sync in the correct cells without repeating the RACH procedure and without negotiating UE's data transmission at the new serving gNB-DU 114. Further, the above mentioned two solutions ensure RACH less HO during inter-cell change. To understand the solutions discussed in foregoing paragraphs is detail, reference may be made to FIGS. 3A and 3B discussed in detail in forthcoming paragraphs.

Figure 3A:
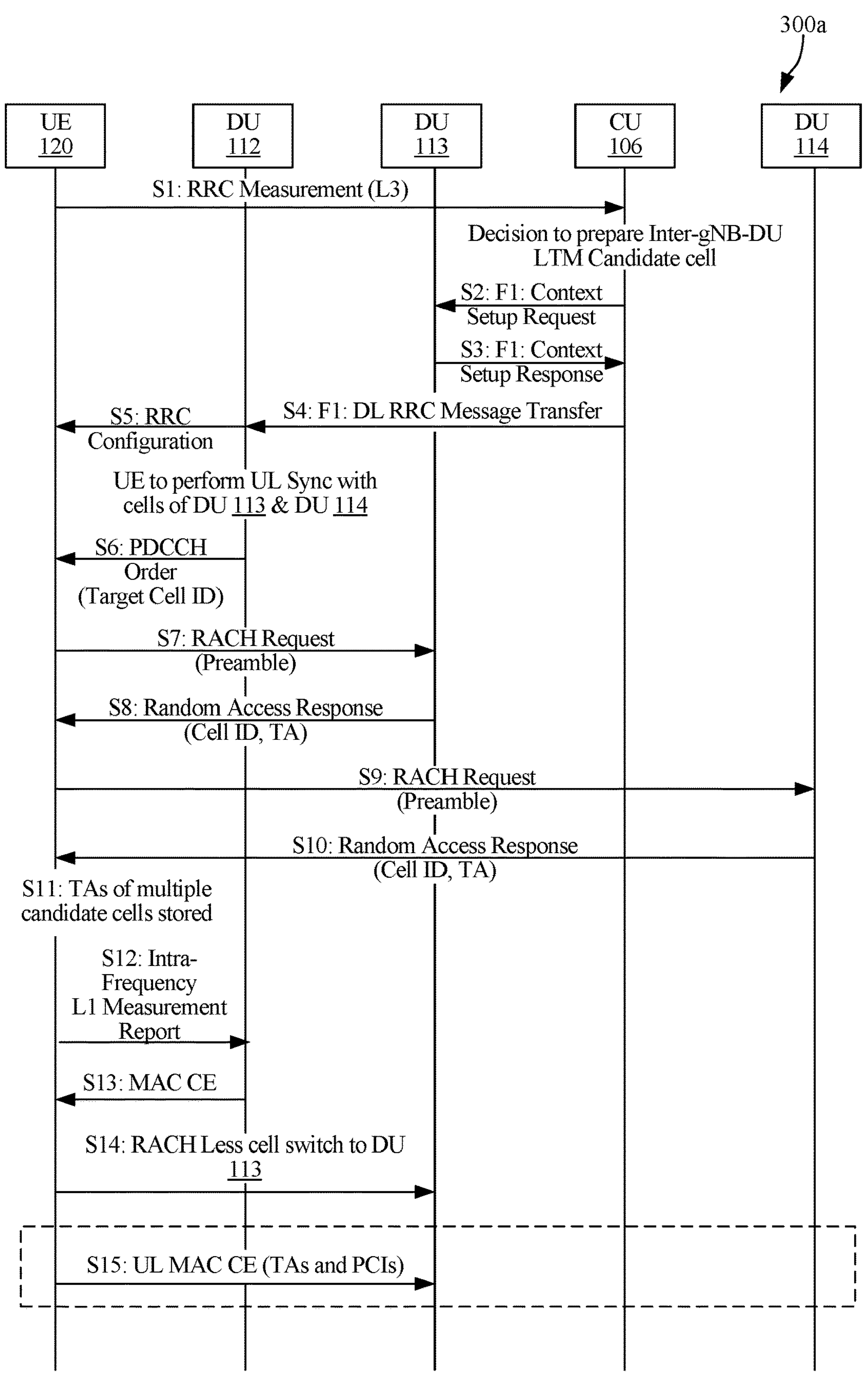
FIG. 3A shows a signaling diagram 300*a* for timing advance management during L1/L2 centric inter-cell change, in accordance with some aspects of the present disclosure.

Referring to FIG. 3A that discloses a signaling diagram 300*a* for timing advance management during L1/L2 centric inter-cell change, in accordance with an aspect of present disclosure. The signaling diagram 300*a* includes a user equipment (UE) 120, a serving gNB-DU 112, a serving gNB-CU 106, a candidate gNB-DU 113, and another candidate gNB-DU 114.

Initially, the UE 120 may perform Layer-3 (L3) RRC measurement and transmits the RRC measurement report to gNB-CU 106 (as shown by step S1). The gNB-CU 106 may process the RRC measurement report and may decide use Layer (L1/L2) Triggered Mobility (LTM). The gNB-CU 106 may prepare an inter-gNB-DU LTM candidate cell based on the RRC measurement report received from the UE 120.

In response, the gNB-CU 106 may initiate the LTM candidate cell preparation by transmitting a F1: context setup request to the candidate gNB-DU 113 serving the candidate cell that is selected as LTM candidate cell (as shown by step S2).

Upon receiving the F1: context setup request the candidate gNB-DU 113 may then transmit the context setup response comprising the CellGroupConfig to the gNB-CU 106 (as shown by step S3). In an exemplary aspect, the CellGroupConfig may at least comprise the target cell configuration prepared by the candidate gNB-DU 113. However, the information CellGroupConfig is not limited to above example and may comprise any other information associated with cells of the candidate gNB-DU 113. Further, the features disclosed by way of step S3 is not limited to candidate gNB-DU 113 and may be performed similarly for other candidate gNB-DU 114 as well.

It is to be noted that the number of candidate gNB-DUs i.e., candidate gNB-DU 113 and candidate gNB-DU 114 are exemplary and may vary based on the L3 RRC measurement carried out by the UE 120.

Moving on, the gNB-CU 106 may carry out F1: downlink (DL) RRC Message Transfer comprising the RRC Reconfiguration to the serving gNB-DU 112 (as shown by step S4). In an aspect, the RRC Reconfiguration may include the LTM target cell configuration. Further, it is to be noted that the process disclosed in the steps S2-S4 (in foregoing paragraphs) may be performed through F1 interface that supports exchange of signaling and information between the gNB-DUs and the gNB-CU.

As a next step, the serving gNB-DU 112 may forward the RRC Reconfiguration message that includes the LTM target cell configuration to the UE 120 (as shown by step S5). Those skilled in the art will appreciate that the RRC Reconfiguration message that includes the LTM target cell configuration may be used by the UE 120, while performing uplink sync with the candidate gNB-DUs and also after the LTM serving cell switch.

Subsequently, the serving gNB-DU 112 may transmit the Physical Downlink Control Channel (PDCCH) order to the UE 120 (as shown by step S6). The PDCCH order may be used to instruct the UE 120 to perform uplink synchronization with the candidate cells of the candidate gNB-DUs 113 and 114. The PDCCH order comprises PCIs of the candidate cells that are being served by the candidate gNB-DUs 113 and 114.

The UE 120 may then perform the UL Sync with the candidate gNB-DUs 113 by transmitting RACH Preamble in the RACH Request to the candidate gNB-DUs 113 (as shown by step S7). In an aspect, the RACH Preamble may be used by the UE 120 to obtain timing advance (TA) associated with candidate cell. In response, the candidate gNB-DUs 113 may configure the Random Access Response (RAR) with the corresponding TA of the candidate cell and cell ID of the candidate cell, and transmit the RAR including the TA of the candidate cell (as shown by step S8). This RAR may be sent directly from the target gNB-DU to the UE or via the gNB-CU and the serving gNB-DU. The TA for the candidate cell may be valid for a timing advance alignment timer after which the TA expires at the UE 120. In an essential aspect, it is to be noted that the processes similar to that disclosed in steps S7 and S8, may be performed at steps S9 and S10 to obtain TA associated with candidate cell of the candidate gNB-DUs 114 and the same are explained for the sake of brevity.

Upon receiving the TAs of multiple candidate cells, the UE 120 may store, the TAs of multiple candidate cells along with their corresponding PCIs (as shown by step S11). Subsequently, the UE 120 may perform intra-frequency Layer-1 (L1) measurements on the configured LTM candidate target cell(s), and transmits L1 measurement report to the serving gNB-DU 112 (as shown by step S12). The serving gNB-DU 112 may use the intra-frequency L1 measurement report to determine best target cell out of the target candidate cells for the UE 120. In an exemplary aspect, the candidate cell of the candidate gNB-DU 113 may be selected as target cell based on the intra-frequency L1 measurements carried out by the UE 120.

The serving gNB-DU 112 may then transmit the target cell PCI and the beam information of the target cell through the MAC control element (as shown by step S13). The MAC CE is transmitted by the serving gNB-DU 112 to the UE 120 for executing the LTM cell switch to the target cell.

The UE 120 may use the previously stored TA of the target cell to perform the RACH less HO to the gNB-DU 113 (as shown by step S14). Once, the RACH less HO is executed, the UE 120 may free up the resource of the previously serving gNB-DU 112 and start uplink and downlink transmission through the new serving gNB-DU 113.

Finally, the UE 120 may transmit the list of PCIs and their respective TAs to the new serving gNB-DU 113, in response to the successful completion of the LTM serving cell switch (as shown by step S15). The transmission transmit of the list of PCIs and their respective TAs may comprise transmission of the MAC CE or a similar L1/L2 command, comprising the list of PCIs and their respective TAs, which were previously acquired by the UE 120.

Thus, the transmission of the list of PCIs and their respective TAs to the new serving gNB-DU 113 facilitates the new serving gNB-DU 113 to re-use the TA timers received from the UE 120, wherever required. The list of candidate cell IDs and the TAs facilitates the new serving gNB-DU 113 to initiate UL sync in the correct cells without repeating the RACH procedure and without negotiating UE's data transmission at the new serving gNB-DU 113. Further, the transmission of the list of PCIs and their respective TAs to the new serving gNB-DU 113 ensures RACH less HO during inter-cell change.

Figure 3B:
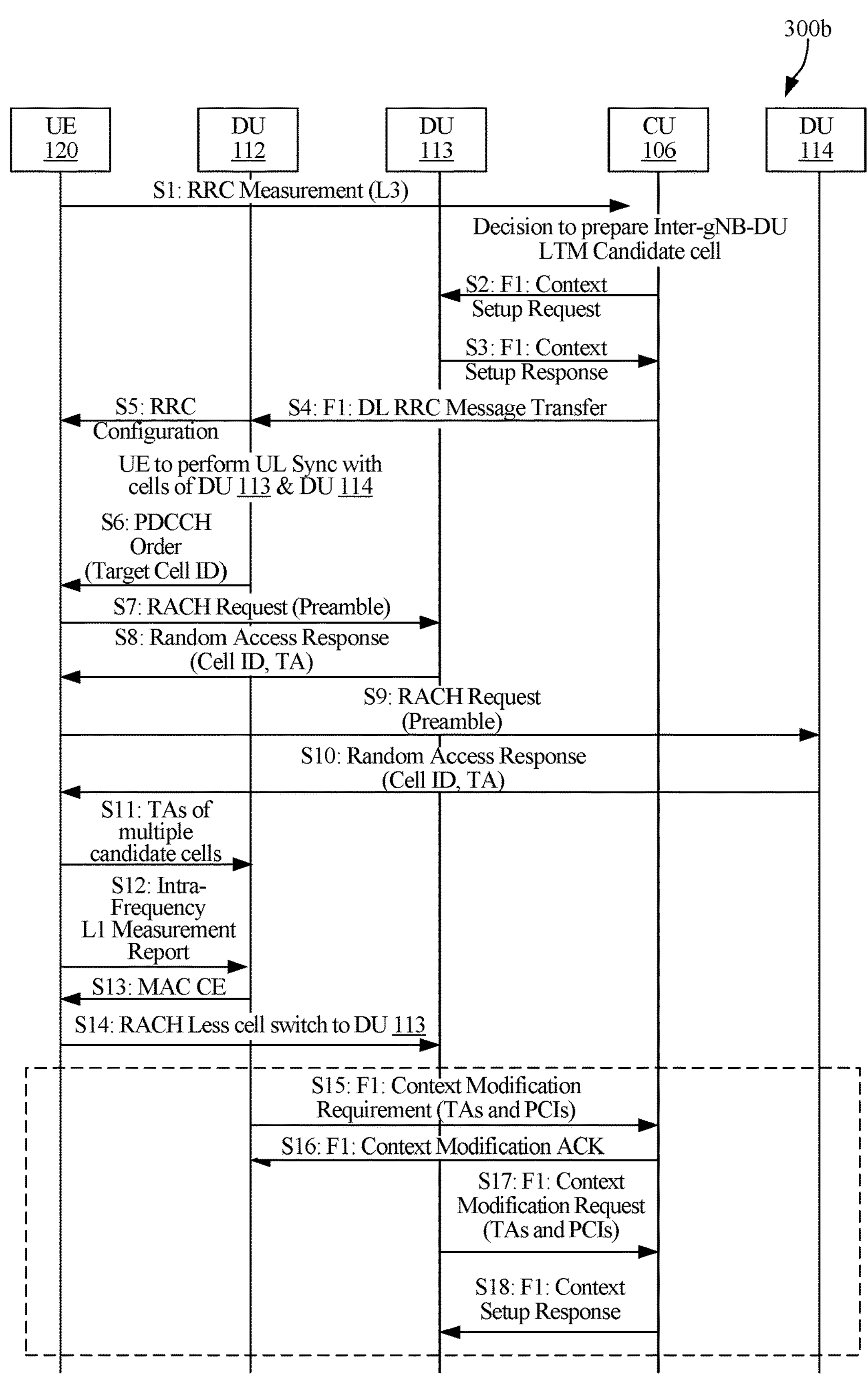
FIG. 3B shows a signaling diagram 300*b* for timing advance management during L1/L2 centric inter-cell change, in accordance with some aspects of the present disclosure.

Referring to FIG. 3B that discloses a signaling diagram 300*a* for timing advance management during L1/L2 centric inter-cell change, in accordance with an aspect of present disclosure. The signaling diagram 300*a* includes a user equipment (UE) 120, a serving gNB-DU 112, a gNB-CU 106, a candidate gNB-DU 113, and another candidate gNB-DU 114.

Initially, the UE 120 may perform Layer-3 (L3) RRC measurement and transmits the RRC measurement report to gNB-CU 106 (as shown by step S1). The gNB-CU 106 may process the RRC measurement report and may decide use Layer (L1/L2) Triggered Mobility (LTM). The gNB-CU 106 may prepare inter-gNB-DU LTM candidate cell based on the RRC measurement report received from the UE 120.

In response, the gNB-CU 106 may initiates the LTM candidate cell preparation by transmitting F1: context setup request to the candidate gNB-DU 113 serving the candidate cell that is selected as LTM candidate cell (as shown by step S2).

Upon receiving the context setup request, the candidate gNB-DU 113 may then transmit the F1: context setup response comprising the CellGroupConfig to the gNB-CU 106 (as shown by step S3). In an exemplary aspect, the CellGroupConfig may comprise target cell configuration prepared by the candidate gNB-DU 113. However, the information CellGroupConfig is not limited to above example and may comprise any other information associated with cells of the candidate gNB-DU 113. Further, the features disclosed by way of step S3 is not limited to candidate gNB-DU 113 and may be performed similarly for other candidate gNB-DU 114 as well.

It is to be noted that the number of candidate gNB-DUs i.e., candidate gNB-DU 113 and candidate gNB-DU 114 are exemplary and may vary based on the L3 RRC measurement carried out by the UE 120.

Moving on, the gNB-CU 106 may carry out downlink (DL) RRC Message Transfer comprising the RRC Reconfiguration to the serving gNB-DU 112 (as shown by step S4). In an aspect, the RRC Reconfiguration may include the LTM target cell configuration. Further, it is to be noted that the process disclosed in the step S2-S4 (in foregoing paragraphs) may be performed through F1 interface that supports exchange of signaling and information between the gNB-DUs and the gNB-CU.

As a next step, the serving gNB-DU 112 may forward the RRC Reconfiguration message that includes the LTM target cell configuration to the UE 120 (as shown by step S5). Those skilled in the art will appreciate that the RRC Reconfiguration message that includes the LTM target cell configuration may be used by the UE 120, while performing uplink sync with the candidate gNB-DUs.

Subsequently, the serving gNB-DU 112 may transmit the Physical Downlink Control Channel (PDCCH) order to the UE 120 (as shown by step S6). The PDCCH order may be used to instruct the UE 120 to perform uplink synchronization with the candidate cells of the candidate gNB-DUs 113 and 114. The PDCCH order comprises PCIs of the candidate cells that are being served by the candidate gNB-DUs 113 and 114.

The UE 120 may then perform the UL Sync with the candidate gNB-DUs 113 by transmitting RACH Preamble in a RACH request message to the candidate gNB-DUs 113 (as shown by step S7). In an aspect, the RACH Preamble may be used by the UE 120 to obtain timing advance (TA) associated with candidate cell. In response, the candidate gNB-DUs 113 may configure the Random Access Response (RAR) with the corresponding TA of the candidate cell and cell ID of the candidate cell, and transmit the RAR including the TA of the candidate cell (as shown by step S8). The TA for the candidate cell may be valid for a timing advance alignment timer after which the TA expires at the UE 120. In an essential aspect, it is to be noted that the processes similar to that disclosed in steps S7 and S8, steps S9 and S10 may be performed to obtain TA associated with candidate cell of the candidate gNB-DUs 114 and the same are explained for the sake of brevity.

Upon receiving the TAs of multiple candidate cells, the UE 120 may transmit TAs of multiple candidate cells along with their corresponding PCIs to the serving gNB-DU 112 (as shown by step S11). Subsequently, the UE 120 may performs intra-frequency Layer-1 (L1) measurements on the configured LTM candidate target cell(s), and transmits L1 measurement report to the serving gNB-DU 112 (as shown by step S12). The serving gNB-DU 112 may use the intra-frequency L1 measurement report to determine best target cell out of the target candidate cells for the UE 120. In an exemplary aspect, the candidate cell of the candidate gNB-DU 113 may be selected as target cell based on the intra-frequency L1 measurements carried out by the UE 120.

The serving gNB-DU 112 may transmit the target cell PCI and the beam information of the target cell through the MAC control element. The MAC CE is transmitted by the serving gNB-DU 112 to the UE 120 for executing the LTM cell switch to the target cell (as shown by step S13).

The UE 120 may use the previously stored TA of the target cell to perform the RACH less HO to the gNB-DU 113 (as shown by step S14). Once, the RACH less HO is executed, the UE 120 may free up the resource of the previously serving gNB-DU 112 and start uplink and downlink transmission through the new serving gNB-DU 113.

The old serving gNB-DU 112 may transmit F1: context modification requirement comprising the list of PCIs and their respective TAs to the gNB-CU 106, in response to execution of the LTM cell switch (as shown by step S15). In response, the gNB-CU 106 may transmit the F1: context modification ACK message back to the old serving gNB-DU 112 (as shown by step S16).

The gNB-CU 106 may transmit the F1: context modification request to the new serving gNB-DU 113 (as shown by step S17). The context modification request may comprise the list of PCIs and their respective TAs, which were previously acquired by the UE 120. In response, the new serving gNB-DU 113 may transmit F1: context setup response in response to receiving the list of PCIs and their respective TAs (as shown by step S18). Further, it is to be noted that the process disclosed in the steps S15-S18 (in foregoing paragraphs) may be performed through F1 interface that supports exchange of signaling and information between the gNB-DUs and the gNB-CU.

Thus, the transmission of the list of PCIs and their respective TAs to the new serving gNB-DU 113 facilitates the new serving gNB-DU 113 to re-use the TA timers received from the old serving gNB-DU 112, wherever required. The list of candidate cell IDs and the TAs facilitates the new serving gNB-DU 113 to initiate UL sync in the correct cells without repeating the RACH procedure and without negotiating UE's data transmission at the new serving gNB-DU 113. Further, the above mentioned solution ensures RACH less HO during inter-cell change.

Figure 4:
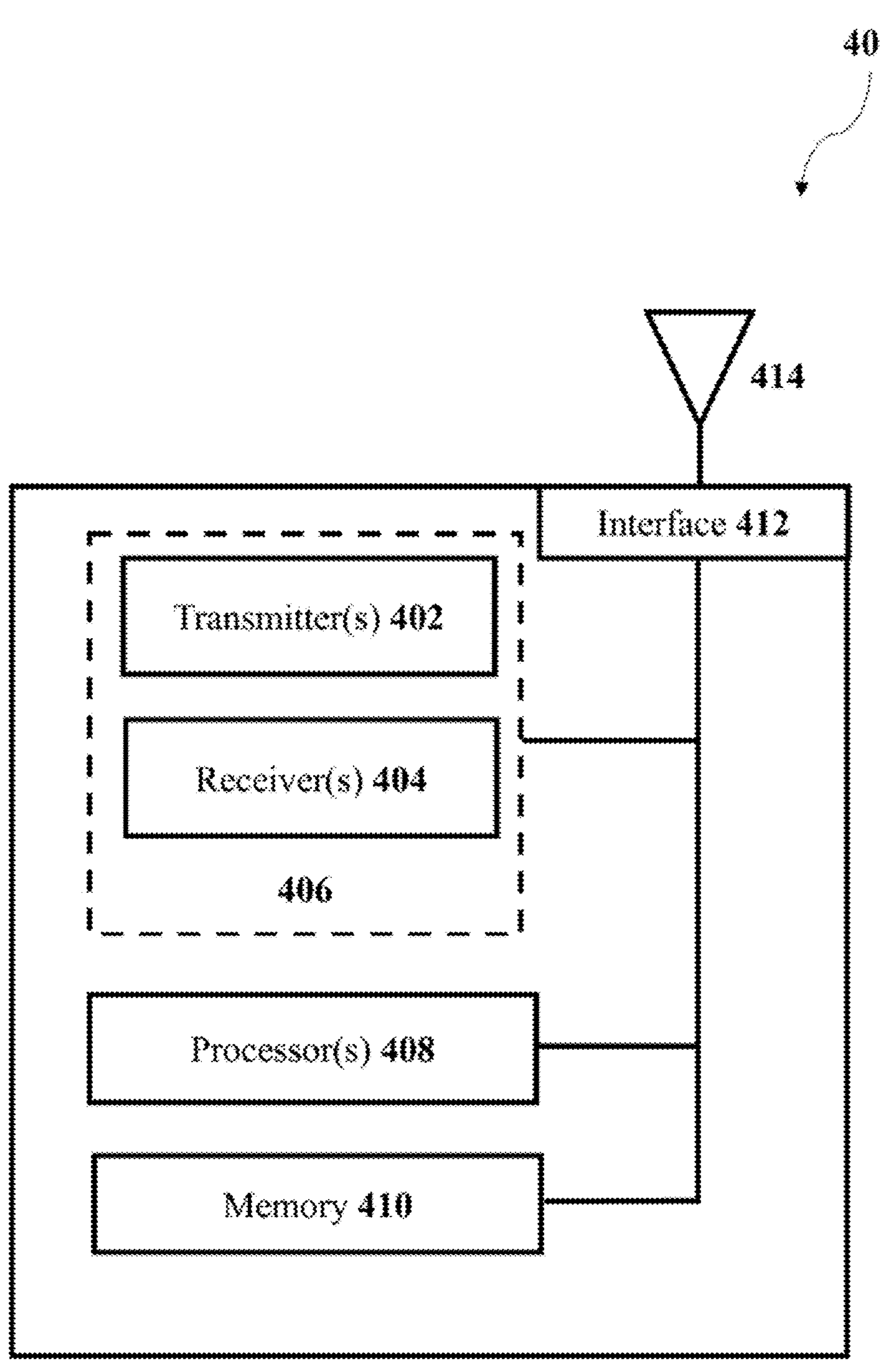
FIG. 4 shows a high-level block diagram of an apparatus 400 for timing advance management during L1/L2 centric inter-cell change, in accordance with some aspects of the present disclosure.

Referring now to FIG. 4 which illustrates a block diagram of an apparatus 400 for timing advance management during L1/L2 centric inter-cell change, in accordance with some aspects of the present disclosure. The apparatus 400 may comprise at least one transmitter 402, at least one receiver 404, at least one processor 408, memory 410, at least one interface 412, and at least one antenna 414. The at least one transmitter 402 may be configured to transmit data/information to one or more entities using the antenna 414 and the at least one receiver 404 may be configured to receive data/information from the one or more nodes/devices using the antenna 414. The at least one transmitter and receiver may be collectively implemented as a single transceiver module 406. In one non-limiting aspect, the at least one processor 408 may be communicatively coupled with the transceiver 406, memory 410, interface 412, and antenna 414 for timing advance management during L1/L2 centric inter-cell change.

The at least one processor 408 may include, but not restricted to, microprocessors, microcomputers, micro-controllers, central processing units, state machines, logic circuitries, and/or any devices that manipulate signals based on operational instructions. A processor may also be implemented as a combination of computing devices, e.g., a combination of a plurality of microprocessors or any other such configuration. The memory 410 may be communicatively coupled to the at least one processor 408 and may comprise various instructions for executing the dynamic vDU scaling technique. The memory 410 may include a Random-Access Memory (RAM) unit and/or a non-volatile memory unit such as a Read Only Memory (ROM), optical disc drive, magnetic disc drive, flash memory, Electrically Erasable Read Only Memory (EEPROM), a memory space on a server or cloud and so forth. The at least one processor 408 may be configured to execute one or more instructions stored in the memory 410.

The interfaces 412 may include a variety of software and hardware interfaces, for example, a web interface, a graphical user interface, an input device-output device (I/O) interface, a network interface and the like. The I/O interfaces may allow the apparatus 400 to communicate with one or more nodes/devices either directly or through other devices. The network interface may allow the apparatus 400 to interact with one or more networks either directly or via any other network.

In one non-limiting aspect, the apparatus 400 may be a part of the UE 120 but not limited thereto.

The at least one processor 408 may be configured to obtain timing advances (TAs) for one or more Layer (L1/L2) Triggered Mobility (LTM) candidate cells based on indication from a serving gNB-DU and store the obtained TAs in the memory 410. For the determination of the one or more candidate cells, the at least one processor 408 may be configured to perform L3 RRC measurement and transmit L3 RRC measurement report to gNB-Control Unit (CU). The L3 RRC measurement report may be used by the gNB-CU to prepare inter-gNB-DU LTM candidate cells. The at least one processor 408 may be then configured to receive RRC reconfiguration message comprising configuration of at least one candidate cell from the gNB-CU based on the L3 RRC measurement report.

The at least one processor 408 may be then configured to receive Layer (L1/L2) Triggered Mobility (LTM) serving cell switch command to switch from a current serving cell to a target cell. The current serving cell may be the current serving cell and the target cell may one of the candidate cells selected for cell switch. The target cell selection may be carried out using the procedure, as discussed in explanation of FIGS. 3A and 3B above.

The current serving cell may be served by a serving gNodeB Distributed Unit (gNB-DU) and the target cell is served by a target gNB-DU. The at least one processor 408 may be then configured to transmit, a list of candidate cell IDs and the stored TAs corresponding to the list of candidate cell IDs, to the target gNB-DU serving the target cell, in response to the successful of the LTM cell switch.

In order to obtain TAs for one or more LTM candidate cells, the at least one processor 408 may be configured to receive, from the serving gNB-DU, a Physical Downlink Control Channel (PDCCH) order to perform uplink synchronization with at least one candidate cell of at least one candidate gNB-DU. The PDCCH order may at least comprise physical cell ID (PCI) of at least one candidate cell being served by the at least one candidate gNB-DU. However, the PDCCH order is not limited to PCIs of candidate cells and may comprise another information related to the candidate cell.

The at least one processor 408 may be then configured to transmit a Random Access Channel (RACH) preamble to the at least one candidate gNB-DU, receive a Random Access Response comprising the TA of the at least one candidate cell from the at least one candidate gNB-DU, and store the TA of the at least one candidate cell based on TA alignment timer. TA alignment timer may indicate the duration for which TA received from the candidate gNB-DU is valid. The TA expires when the TA alignment timer expires. The process of transmission of Random Access Channel (RACH) Preamble may be carried out for each candidate cell for which PDCCH order is received.

Further, in order to receipt of LTM cell switch command to switch from the current serving cell to the target cell, the at least one processor 408 may be configured to perform intra-frequency L1 measurement for at least one candidate cell periodically or after a predetermined time duration. The at least one processor 408 may be then configured to transmit intra-frequency L1 measurement report of the at least one candidate cell to the serving gNB-DU. The intra-frequency L1 measurement report may be used by the serving gNB-DU to select the target cell out of the plurality of candidate cells.

The at least one processor 408 may be then configured to receive LTM cell switch command from the serving gNB-DU based on the intra-frequency L1 measurement report. The LTM cell switch command may at least comprise physical cell ID (PCI) of the target cell and beam information of the target cell. The at least one processor 408 may be then configured to perform LTM cell switch from the current serving cell to the target cell based on the LTM cell switch command.

In one non-limiting aspect, in order to transmit the list of candidate cell IDs and the stored TAs corresponding to the list of candidate cell IDs, the at least one processor 408 may be configured to transmit, MAC control element (CE) comprising the list of candidate cell IDs and the stored TAs corresponding to the list of candidate cell IDs, to the target gNB-DU.

In an aspect of the present disclosure, at least one processor 408 may be configured to transmit, MAC control element (CE) comprising the list of candidate cell IDs and the stored TAs corresponding to the list of candidate cell IDs, to the serving gNB-DU. The serving gNB-DU may store the list of candidate cell IDs and the stored TAs corresponding to the list of candidate cell IDs.

In one non-limiting aspect of the present disclosure, the serving gNB-DU and the target gNB-DU may belong to different gNB for facilitating inter-gNB-DU LTM. In another non-limiting aspect of the present disclosure, the serving gNB-DU and the target gNB-DU may belong to same gNB for facilitating intra-gNB-DU LTM.

Further, by the transmission of the list of PCIs and their respective TAs to the new/target serving gNB-DU, the system 400 facilitates the new serving gNB-DU to re-use the TA timers, wherever required. The list of candidate cell IDs and the TAs facilitates the new serving gNB-DU to initiate UL sync in the correct cells without repeating the RACH procedure and without negotiating UE's data transmission at the new serving gNB-DU. Also, the transmission of the list of PCIs and their respective TAs to the new/target serving gNB-DU ensures RACH less HO during inter-cell change.

Figure 5:
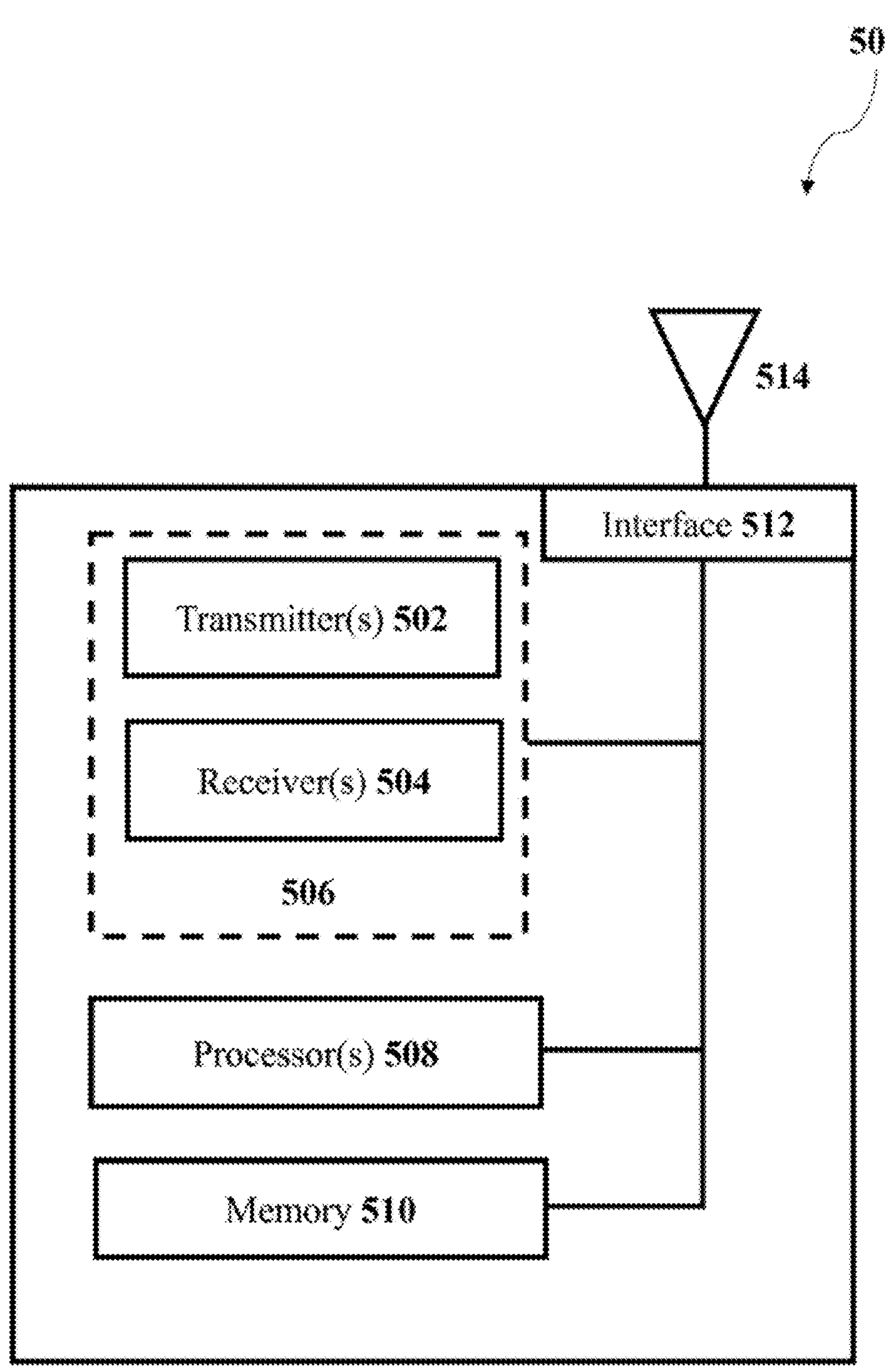
FIG. 5 shows a high-level block diagram of an apparatus 500 for timing advance management during L1/L2 centric inter-cell change, in accordance with some aspects of the present disclosure.

Referring now to FIG. 5 which illustrates a block diagram of an apparatus 500 for timing advance management during L1/L2 centric inter-cell change, in accordance with some aspects of the present disclosure. The apparatus 500 may comprise at least one transmitter 502, at least one receiver 504, at least one processor 508, memory 510, at least one interface 512, and at least one antenna 514. The at least one transmitter 502 may be configured to transmit data/information to one or more entities using the antenna 514 and the at least one receiver 504 may be configured to receive data/ information from the one or more nodes/devices using the antenna 514. The at least one transmitter and receiver may be collectively implemented as a single transceiver module 506. In one non-limiting aspect, the at least one processor 508 may be communicatively coupled with the transceiver 506, memory 510, interface 512, and antenna 514 for timing advance management during L1/L2 centric inter-cell change.

The at least one processor 508 may include, but not restricted to, microprocessors, microcomputers, micro-controllers, central processing units, state machines, logic circuitries, and/or any devices that manipulate signals based on operational instructions. A processor may also be implemented as a combination of computing devices, e.g., a combination of a plurality of microprocessors or any other such configuration. The memory 510 may be communicatively coupled to the at least one processor 508 and may comprise various instructions for executing the dynamic vDU scaling technique. The memory 510 may include a Random-Access Memory (RAM) unit and/or a non-volatile memory unit such as a Read Only Memory (ROM), optical disc drive, magnetic disc drive, flash memory, Electrically Erasable Read Only Memory (EEPROM), a memory space on a server or cloud and so forth. The at least one processor 508 may be configured to execute one or more instructions stored in the memory 510.

The interfaces 512 may include a variety of software and hardware interfaces, for example, a web interface, a graphical user interface, an input device-output device (I/O) interface, a network interface and the like. The I/O interfaces may allow the apparatus 500 to communicate with one or more nodes/devices either directly or through other devices. The network interface may allow the apparatus 500 to interact with one or more networks either directly or via any other network.

In one non-limiting aspect, the apparatus 500 may be a part of the serving gNB-DU but not limited thereto.

The at least one processor 508 may be configured to receive a list of candidate cell IDs and corresponding timing advances (TAs) from a user equipment (UE). In one non-limiting aspect, the at least one processor 508 may be configured to receive, MAC control element (CE) comprising the list of candidate cell IDs and the corresponding TAs, from the UE. The UE may obtain the list of candidate cell IDs and corresponding timing advances (TAs) using the procedure discussed in explanation of FIGS. 3A and 3B above.

The at least one processor 508 may be then configured to execute Layer (L1/L2) Triggered Mobility (LTM) cell switch of the UE from a current serving cell to a target cell. The current serving cell may be the current serving cell and the target cell may one of the candidate cells selected for cell switch. The target cell selection may be carried out using the procedure, as discussed in explanation of FIGS. 3A and 3B above.

The current serving cell may be served by a serving gNodeB Distributed Unit (gNB-DU) and the target cell is served by a target gNB-DU. The at least one processor 508 may be then configured to transmit, the list of candidate cell IDs and the corresponding TAs, to the target gNB-DU serving the target cell, in response to the execution of the LTM cell switch.

In order to transmit the list of candidate cell IDs and the corresponding TAs, the at least one processor 508 may be configured to transmit the list of candidate cell IDs and the corresponding TAs, to the target gNB-DU via the gNB-Control Unit (CU). In one non-limiting aspect, the at least one processor 508 may be configured to transmit the list of candidate cell IDs and the corresponding TAs, to the target gNB-DU directly.

In one non-limiting aspect of the present disclosure, the serving gNB-DU and the target gNB-DU may belong to different gNB for facilitating inter-gNB-DU LTM. In another non-limiting aspect of the present disclosure, the serving gNB-DU and the target gNB-DU may belong to same gNB for facilitating intra-gNB-DU LTM.

By the transmission of the list of PCIs and their respective TAs to the new/target serving gNB-DU, the system 500 facilitates the new serving gNB-DU to re-use the TA timers, wherever required. The list of candidate cell IDs and the TAs facilitates the new serving gNB-DU to initiate UL sync in the correct cells without repeating the RACH procedure and without negotiating UE's data transmission at the new serving gNB-DU. Also, the transmission of the list of PCIs and their respective TAs to the new/target serving gNB-DU ensures RACH less HO during inter-cell change.

Figure 6:
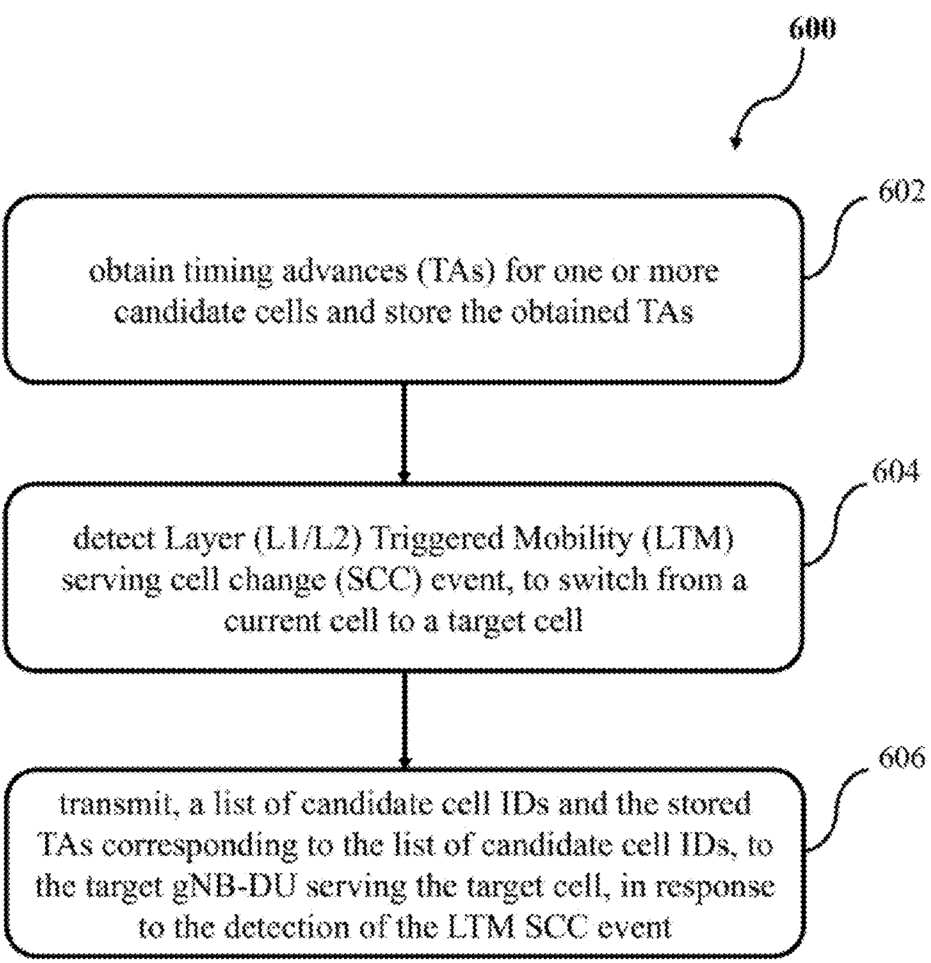
FIG. 6 shows a flowchart of an exemplary method 600 of timing advance management during L1/L2 centric inter-cell change, in accordance with some aspects of the present disclosure.

Referring now to FIG. 6, a flowchart is described illustrating an exemplary method 600 of timing advance management during L1/L2 centric inter-cell change, in accordance with some aspects of the present disclosure. The method 600 is merely provided for exemplary purposes, and aspects are intended to include or otherwise cover timing advance management procedures.

The method 600 may include, at block 602, obtaining timing advances (TAs) for one or more Layer (L1/L2) Triggered Mobility (LTM) candidate cells based on indication from a serving gNB-DU and storing the obtained TAs. For example, the TAs of the candidate cells may be received from the candidate gNB-DU serving the respective candidate cell. The process of obtaining the TAs for one or more candidate cells and storing the obtained TAs is discussed in further detail below in explanation of FIG. 6A.

The method 600 may include, at block 604, receiving Layer (L1/L2) Triggered Mobility (LTM) serving cell switch command to switch from a current serving cell to a target cell. The current serving cell may be the current serving cell and the target cell may one of the candidate cells selected for cell switch. The target cell selection is discussed in further detail in below aspect. The current serving cell may be served by a serving gNodeB Distributed Unit (gNB-DU) and the target cell is served by a target gNB-DU.

Further, in order to receipt of the LTM cell switch command to switch from the current serving cell to the target cell, the method 600 may include periodically performing intra-frequency L1 measurement for at least one candidate cell periodically after every predetermined time duration and transmitting intra-frequency L1 measurement report of the at least one candidate cell to the serving gNB-DU. The intra-frequency L1 measurement report may be used by the serving gNB-DU to select the target cell out of the candidate cells.

The method 600 may further include receiving LTM cell switch command from the serving gNB-DU based on the intra-frequency L1 measurement report. The LTM cell switch command may at least comprise physical cell ID (PCI) of the target cell and beam information of the target cell. The method 600 may further include performing LTM cell switch from the current serving cell to the target cell based on the LTM cell switch command.

The method 600 may include, at block 606, transmitting, a list of candidate cell IDs and the stored TAs corresponding to the list of candidate cell IDs, to the target gNB-DU serving the target cell, in response to the successful completion of the LTM cell switch. For transmitting the list of candidate cell IDs and the stored TAs corresponding to the list of candidate cell IDs, the method 600 may include transmitting, MAC control element (CE) comprising the list of candidate cell IDs and the stored TAs corresponding to the list of candidate cell IDs, to the target gNB-DU.

In one non-limiting aspect of the present disclosure, the method 600 may further include transmitting, MAC control element (CE) comprising the list of candidate cell IDs and the stored TAs corresponding to the list of candidate cell IDs, to the serving gNB-DU. The serving gNB-DU may store the list of candidate cell IDs and the stored TAs corresponding to the list of candidate cell IDs.

In an aspect of the present disclosure, the method 600 may include performing L3 RRC measurement and transmitting L3 RRC measurement report to gNB-Control Unit (CU). The L3 RRC measurement report may be used by the gNB-CU to prepare inter-gNB-DU LTM candidate cells. The process of preparation of LTM candidate cell is discussed in detail in explanation of FIGS. 3A and 3B above. The method 600 may further include receiving RRC reconfiguration message comprising configuration of at least one candidate cell from the gNB-CU.

In one non-limiting aspect of the present disclosure, the serving gNB-DU and the target gNB-DU may belong to different gNB for facilitating inter-gNB-DU LTM. In another non-limiting aspect of the present disclosure, the serving gNB-DU and the target gNB-DU may belong to same gNB for facilitating intra-gNB-DU LTM.

By transmitting the list of PCIs and their respective TAs to the new/target serving gNB-DU, the method 600 facilitates the new serving gNB-DU to re-use the TA timers, wherever required. The list of candidate cell IDs and the TAs also facilitates the new serving gNB-DU to initiate UL sync in the correct cells without repeating the RACH procedure and without negotiating UE's data transmission at the new serving gNB-DU. Also, the transmission of the list of PCIs and their respective TAs to the new/target serving gNB-DU ensures RACH less HO during inter-cell change.

Figure 6A:
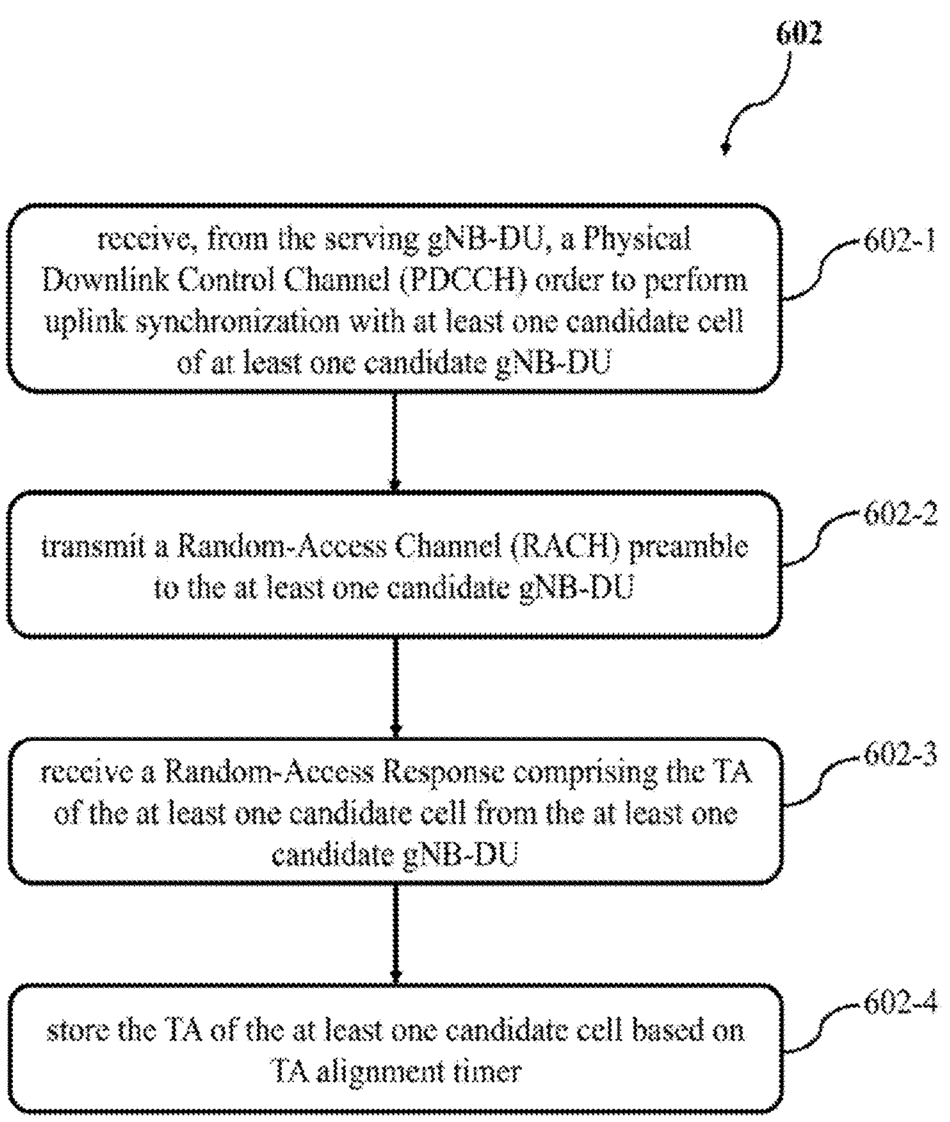
FIG. 6A shows a sub-flowchart of an exemplary method 602 of obtaining timing advance by a user equipment (UE), in accordance with some aspects of the present disclosure.

Referring now to FIG. 6A, a sub-flowchart is described illustrating an exemplary method 602 of obtaining timing advance by a user equipment (UE), according to an aspect of the present disclosure. The method 602 is merely provided for exemplary purposes, and aspects are intended to include or otherwise cover timing advance obtaining methods or procedures.

The method 602 may include, at block 602-1, receiving a Physical Downlink Control Channel (PDCCH) order to perform uplink synchronization with at least one candidate cell of at least one candidate gNB-DU. The PDCCH order may be received from the serving gNB-DU after receiving the RRC Reconfiguration from the gNB-CU. The PDCCH order may at least comprise physical cell ID (PCI) of at least one candidate cell being served by the at least one candidate gNB-DU. However, the PDCCH order is not limited to PCIs of candidate cells and may comprise another information related to the candidate cell. Further, the PDCCH order may be received for any of the one or more candidate cells.

The method 602 may include, at block 602-2, transmitting a Random Access Channel (RACH) Preamble to the at least one candidate gNB-DU. The method 602 may include, at block 602-3, receiving a Random-Access Response comprising the TA of the at least one candidate cell from the at least one candidate gNB-DU. The Random-Access Response may be configured by the candidate gNB-DU with the TA of the candidate cell for which the RACH Preamble is received.

The method 602 may include, at block 602-4, storing the TA of the at least one candidate cell based on TA alignment timer. TA alignment timer may indicate the duration for which TA received from the candidate gNB-DU is valid. The TA expires when the TA alignment timer expires. The process of transmission of Random Access Channel (RACH) preamble may be carried out for each candidate cell for which PDCCH order is received.

In an essential aspect, the method 602 facilitates the UE to share the TAs acquired by the UE with the target/new serving gNB-DU, which enables the new serving gNB-DU to initiate UL sync in the correct cells without repeating the RACH procedure and without negotiating UE's data transmission at the new serving gNB-DU.

Figure 7:
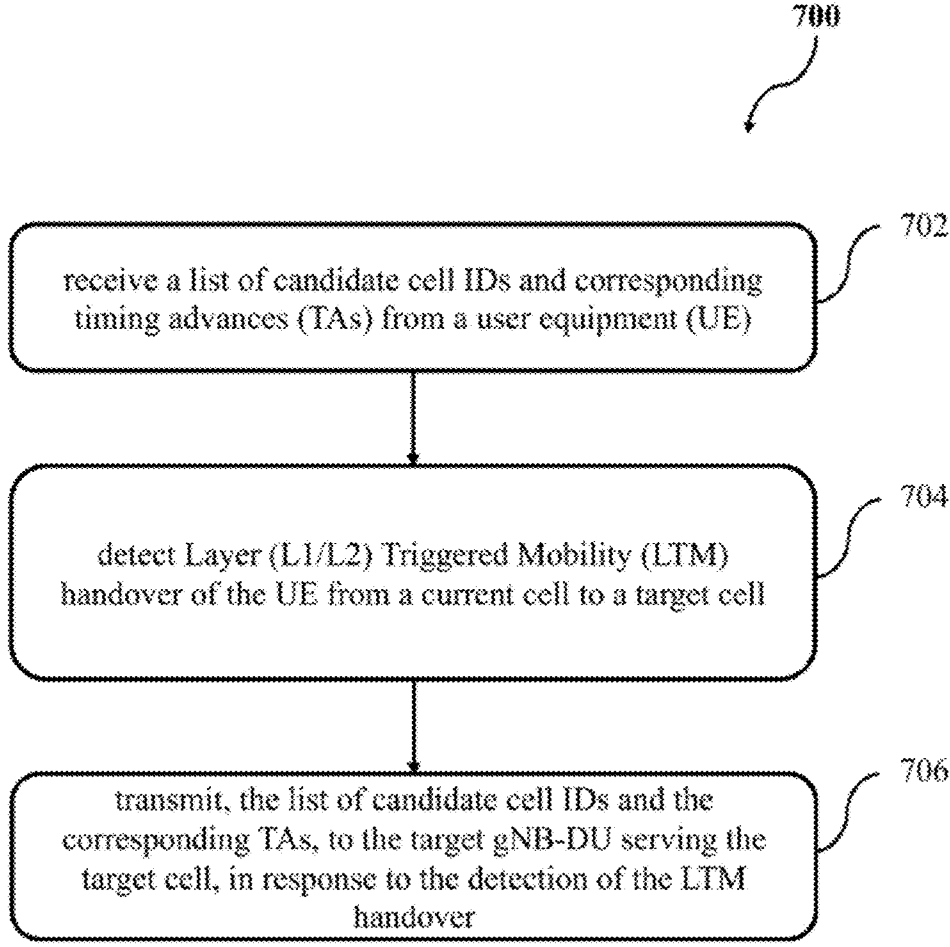
FIG. 7 shows a flowchart of another exemplary method 700 of timing advance management during L1/L2 centric inter-cell change, in accordance with some aspects of the present disclosure.

Referring now to FIG. 7, a flowchart is described illustrating another exemplary method 700 of timing advance management during L1/L2 centric inter-cell change, according to an aspect of the present disclosure. The method 700 is merely provided for exemplary purposes, and aspects are intended to include or otherwise cover any timing advance management methods or procedures.

The method 700 may include, at block 702, receiving a list of candidate cell IDs and corresponding timing advances (TAs) from a user equipment (UE). The UE may acquire the TAs of the candidate cell using the method 602, as discussed in explanation of FIGS. 3A and 3B above. In one non-limiting aspect, for receiving the list of candidate cell IDs and the corresponding timing advances (TAs) the method 700 may include receiving, MAC control element (CE) comprising the list of candidate cell IDs and the corresponding TAs, from the UE.

The method 700 may include, at block 704, executing Layer (L1/L2) Triggered Mobility (LTM) cell switch of the UE from a current serving cell to a target cell. The current serving cell may be the current serving cell and the target cell may be one of the candidate cells selected for cell switch. The current serving cell may be served by a serving gNodeB Distributed Unit (gNB-DU) and the target cell is served by a target gNB-DU. The target cell selection may be carried out using the procedure, as discussed in explanation of FIGS. 3A and 3B above.

The method 700 may include, at block 706, transmitting, the list of candidate cell IDs and the corresponding TAs, to the target gNB-DU serving the target cell, in response to the execution of the LTM cell switch. For transmitting the list of candidate cell IDs and the corresponding TAs, the method 700 may include transmitting the list of candidate cell IDs and the corresponding TAs, to the target gNB-DU via the gNB-Control Unit (CU). In one non-limiting aspect, the method 700 may include transmitting the list of candidate cell IDs and the corresponding TAs, to the target gNB-DU directly.

In one non-limiting aspect of the present disclosure, the serving gNB-DU and the target gNB-DU may belong to different gNB for facilitating inter-gNB-DU LTM. In another non-limiting aspect of the present disclosure, the serving gNB-DU and the target gNB-DU may belong to same gNB for facilitating intra-gNB-DU LTM.

By the transmission of the list of PCIs and their respective TAs to the new/target serving gNB-DU, the method 700 facilitates the new serving gNB-DU to re-use the TA timers, wherever required. The list of candidate cell IDs and the TAs further facilitates the new serving gNB-DU to initiate UL sync in the correct cells without repeating the RACH procedure and without negotiating UE's data transmission at the new serving gNB-DU. Also, the transmission of the list of PCIs and their respective TAs to the new/target serving gNB-DU ensures RACH less HO during inter-cell change.

The above methods 600, 602, 700 may be described in the general context of computer executable instructions. Generally, computer executable instructions can include routines, programs, objects, components, data structures, procedures, modules, and functions, which perform specific functions or implement specific abstract data types.

The various blocks of the methods 600, 602, 700 shown in FIGS. 6, 6A, 7 have been arranged in a generally sequential manner for ease of explanation. However, it is to be understood that this arrangement is merely exemplary, and it should be recognized that the processing associated with methods 600, 602, 700 (and the blocks shown in FIGS. 6, 6A, 7) can occur in a different order (for example, where at least some of the processing associated with the blocks is performed in parallel and/or in an event-driven manner). Additionally, individual blocks may be deleted from the methods without departing from the spirit and scope of the subject matter described herein. Furthermore, the methods can be implemented in any suitable hardware, software, firmware, or combination thereof.

The various operations of methods described above may be performed by any suitable means capable of performing the corresponding functions. The means may include various hardware and/or software component(s) and/or module (s). Generally, where there are operations illustrated in Figures, those operations may have corresponding counterpart means-plus-function components.

It may be noted here that the subject matter of some or all aspects described with reference to FIGS. 1, 2A, 2B, 3A, and 3B may be relevant for the methods and the same is not repeated for the sake of brevity.

In a non-limiting aspect of the present disclosure, one or more non-transitory computer-readable media may be utilized for implementing the aspects consistent with the present disclosure. A computer-readable media refers to any type of physical memory (such as the memory 410 and 510) on which information or data readable by a processor may be stored. Thus, a computer-readable media may store one or more instructions for execution by the at least one processor 408 and 508, including instructions for causing the at least one processor 408 and 508 to perform steps or stages consistent with the aspects described herein. The term "computer-readable media" should be understood to include tangible items and exclude carrier waves and transient signals. By way of example, and not limitation, such computer-readable media can comprise Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Thus, certain non-limiting aspects may comprise a computer program product for performing the operations presented herein. For example, such a computer program product may comprise a computer readable media having instructions stored (and/or encoded) thereon, the instructions being executable by one or more processors to perform the operations described herein. For certain non-limiting aspects, the computer program product may include packaging material.

As used herein, a phrase referring to "at least one" or "one or more" of a list of items refers to any combination of those items, including single members. As an example, "at least one of: a, b, or c" is intended to cover: a, b, c, a-b, a-c, b-c, and a-b-c. The terms "a", "an" and "the" mean "one or more", unless expressly specified otherwise.

A description of an aspect with several components in communication with each other does not imply that all such components are required. On the contrary, a variety of optional components are described to illustrate the wide variety of possible aspects of the disclosed methods and systems.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based here on. Accordingly, the aspects of the present disclosure are intended to be illustrative, but not limiting, of the scope of the disclosure, which is set forth in the appended claims.

The present disclosure may further include at least the below aspects:

Aspect 1

An apparatus comprising:

at least one processor; and a memory communicatively coupled to the at least one processor, wherein the memory stores processor-executable instructions, which, on execution, cause the at least one processor to:

obtain timing advances (TAs) for one or more Layer (L1/L2) Triggered Mobility (LTM) candidate cells based on indication from a serving gNodeB Distributed Unit (gNB-DU) and store the obtained TAs;

receive LTM serving cell switch command, to switch from a current serving cell to a target cell, wherein the current serving cell is served by the serving gNB-DU and the target cell is served by a target gNB-DU; and transmit, a list of candidate cell IDs and the stored TAs corresponding to the list of candidate cell IDs, to the target gNB-DU serving the target cell, in response to the successful completion of the LTM cell switch.

Aspect 2

The apparatus of aspect 1, wherein to obtain TAs for the one or more LTM candidate cells, the at least one processor is configured to:

receive, from the serving gNB-DU, a Physical Downlink Control Channel (PDCCH) order to perform uplink synchronization with at least one LTM candidate cell of at least one candidate gNB-DU, wherein the PDCCH order comprises physical cell ID (PCI) of at least one LTM candidate cell being served by the at least one candidate gNB-DU;

transmit a RACH preamble in a Random Access Channel (RACH) Request to the at least one candidate gNB-DU for the at least one LTM candidate cell;

receive a Random Access Response comprising the TA of the at least one LTM candidate cell either directly from the at least one candidate gNB-DU or via the serving gNB-DU; and store the TA of the at least one LTM candidate cell based on TA alignment timer.

Aspect 3

The apparatus of aspect 1, wherein in response to receipt of the LTM cell switch command to switch from the current serving cell to the target cell, the at least one processor is configured to:

perform, periodically, intra-frequency L1 measurement for at least one LTM candidate cell;

transmit intra-frequency L1 measurement report of the at least one LTM candidate cell to the serving gNB-DU;

receive LTM cell switch command from the serving gNB-DU based on the intra-frequency L1 measurement report, wherein the LTM cell switch command at least comprises physical cell ID (PCI) of the target cell and beam information of the target cell; and perform LTM cell switch from the current serving cell to the target cell based on the LTM cell switch command.

Aspect 4

The apparatus of aspect 1, wherein to transmit the list of candidate cell IDs and the stored TAs corresponding to the list of candidate cell IDs, the at least one processor is configured to:

transmit, an uplink (UL) MAC control element (CE) or a similar L1/L2 command comprising the list of candidate cell IDs and the stored TAs corresponding to the list of candidate cell IDs, to the target gNB-DU.

Aspect 5

The apparatus of aspect 1, wherein the at least one processor is configured to:

transmit, an uplink (UL) MAC control element (CE) or a similar L1/L2 command comprising the list of candidate cell IDs and the stored TAs corresponding to the list of candidate cell IDs, to the serving gNB-DU.

Aspect 6

The apparatus of aspect 1, wherein the at least one processor is configured to:

transmit L3 RRC measurement report to gNB-Control Unit (CU); and receive RRC reconfiguration message comprising configuration of at least one candidate cell from the gNB-CU.

Aspect 7

The apparatus of aspect 1, wherein the serving gNB-DU and the target gNB-DU belong to one of: different gNB or same gNB.

Aspect 8

An apparatus comprising:

at least one processor; and a memory communicatively coupled to the at least one processor, wherein the memory stores processor-executable instructions, which, on execution, cause the at least one processor to:

receive a list of candidate cell IDs and corresponding timing advances (TAs) from a user equipment (UE);

execute Layer (L1/L2) Triggered Mobility (LTM) cell switch of the UE from a current serving cell to a target cell, wherein the current serving cell is served by a serving gNodeB Distributed Unit (gNB-DU) and the target cell is served by a target gNB-DU; and transmit, the list of candidate cell IDs and the corresponding TAs, to the target gNB-DU serving the target cell, in response to the execution of the LTM cell switch.

Aspect 9

The apparatus of aspect 8, wherein to receive the list of candidate cell IDs and the corresponding TAs, the at least one processor is configured to:

receive, an uplink (UL) MAC control element (CE) or a similar L1/L2 command comprising the list of candidate cell IDs and the corresponding TAs, from the UE.

Aspect 10

The apparatus of aspect 8, wherein to transmit the list of candidate cell IDs and the corresponding TAs, the at least one processor is configured to:

transmit, the list of candidate cell IDs and the corresponding TAs, to the target gNB-DU either directly over an interface or via gNB-Control Unit (CU).

Aspect 11

The apparatus of aspect 8, wherein the serving gNB-DU and the target gNB-DU belong to one of: different gNB or same gNB.

Aspect 12

An method comprising:

obtaining timing advances (TAs) for one or more Layer (L1/L2) Triggered Mobility (LTM) candidate cells based on indication from a serving gNodeB Distributed Unit (gNB-DU) and storing the obtained TAs;

receiving LTM serving cell switch command, to switch from a current serving cell to a target cell, wherein the current serving cell is served by the serving gNB-DU and the target cell is served by a target gNB-DU; and transmitting, a list of candidate cell IDs and the stored TAs corresponding to the list of candidate cell IDs, to the target gNB-DU serving the target cell, in response to the successful completion of the LTM cell switch.

Aspect 13

The method of aspect 12, wherein obtaining TAs for the one or more LTM candidate cells comprises:

receiving, from the serving gNB-DU, a Physical Downlink Control Channel (PDCCH) order for performing uplink synchronization with at least one LTM candidate cell of at least one candidate gNB-DU, wherein the PDCCH order comprises physical cell ID (PCI) of at least one LTM candidate cell being served by the at least one candidate gNB-DU;

transmitting a Random Access Channel (RACH) preamble to the at least one candidate gNB-DU for the at least one LTM candidate cell;

receiving a Random Access Response comprising the TA of the at least one LTM candidate cell either directly from the at least one candidate gNB-DU or via the serving gNB-DU; and storing the TA of the at least one LTM candidate cell based on TA alignment timer.

Aspect 14 The method of aspect 12, wherein in response to receiving the LTM cell switch command to switch from the current serving cell to the target cell, the method comprises:

performing, periodically, intra-frequency L1 measurement for at least one LTM candidate cell;

transmitting intra-frequency L1 measurement report of the at least one LTM candidate cell to the serving gNB-DU;

receiving LTM cell switch command from the serving gNB-DU based on the intra-frequency L1 measurement report, wherein the LTM cell switch command at least comprises physical cell ID (PCI) of the target cell and beam information of the target cell; and performing LTM cell switch from the current serving cell to the target cell based on the LTM cell switch command.

Aspect 15

The method of aspect 12, wherein transmitting the list of candidate cell IDs and the stored TAs corresponding to the list of candidate cell IDs comprises:

transmitting, an uplink (UL) MAC control element (CE) or a similar L1/L2 command comprising the list of candidate cell IDs and the stored TAs corresponding to the list of candidate cell IDs, to the target gNB-DU.

Aspect 16

The method of aspect 12, further comprising:

transmitting, an uplink (UL) MAC control element (CE) or a similar L1/L2 command comprising the list of candidate cell IDs and the stored TAs corresponding to the list of candidate cell IDs, to the serving gNB-DU.

Aspect 17

The method of aspect 12, further comprising:

transmitting L3 RRC measurement report to gNB-Control Unit (CU); and receiving RRC reconfiguration message comprising configuration of at least one candidate cell from the gNB-CU.

Aspect 18

A method comprising:

receiving a list of candidate cell IDs and corresponding timing advances (TAs) from a user equipment (UE);

executing Layer (L1/L2) Triggered Mobility (LTM) cell switch of the UE from a current serving cell to a target cell, wherein the current serving cell is served by a serving gNodeB Distributed Unit (gNB-DU) and the target cell is served by a target gNB-DU; and transmitting, the list of candidate cell IDs and the corresponding TAs, to the target gNB-DU serving the target cell, in response to the execution of the LTM cell switch.

Aspect 19

The method of aspect 18, wherein receiving the list of candidate cell IDs and the corresponding TAs comprises:

receiving, an uplink (UL) MAC control element (CE) or a similar L1/L2 command comprising the list of candidate cell IDs and the corresponding TAs, from the UE.

Aspect 20

The method of aspect 18, wherein transmitting the list of candidate cell IDs and the corresponding TAs, the at least one processor is configured to:

transmitting, the list of candidate cell IDs and the corresponding timing advances TAs, to the target gNB-DU either directly over an interface or via gNB-Control Unit (CU).

Aspect 21

A non-transitory computer-readable medium having computer-readable instructions that when executed by a processor causes the processor to perform operations of:

obtaining timing advances (TAs) for one or more Layer (L1/L2) Triggered Mobility (LTM) candidate cells based on indication from a serving gNodeB Distributed Unit (gNB-DU) and store the obtained TAs;

obtaining LTM serving cell switch command from a current serving cell to a target cell, wherein the current serving cell is served by the serving gNB-DU and the target cell is served by a target gNB-DU; and transmitting, a list of candidate cell IDs and the stored TAs corresponding to the list of candidate cell IDs, to the target gNB-DU serving the target cell, in response to the successful completion of the LTM cell switch.

A non-transitory computer-readable medium having computer-readable instructions that when executed by a processor causes the processor to perform operations of:

obtaining a list of candidate cell IDs and corresponding timing advances (TAs) from a user equipment (UE);

executing Layer (L1/L2) Triggered Mobility (LTM) cell switch of the UE from a current serving cell to a target cell, wherein the current serving cell is served by a serving gNodeB Distributed Unit (gNB-DU) and the target cell is served by a target gNB-DU; and transmitting, the list of candidate cell IDs and the corresponding TAs, to the target gNB-DU serving the target cell, in response to the execution of the LTM cell switch.

The invention claimed is:

1. An apparatus comprising:

at least one processor; and a memory communicatively coupled to the at least one processor, wherein the memory stores processor-executable instructions, which, on execution, cause the at least one processor to:

obtain, by a User Equipment (UE), timing advances (TAs) for one or more Layer (L1/L2) Triggered Mobility (LTM) candidate cells based on an indication from a serving gNodeB Distributed Unit (gNB-DU) and store the obtained TAs;

receive, by the UE, an LTM cell switch command to perform an LTM cell switch from a current serving cell to a target cell, wherein the current serving cell is served by the serving gNB-DU and the target cell is served by a target gNB-DU; and transmit, by the UE to the target gNB-DU serving the target cell, a list of candidate cell IDs and the stored TAs corresponding to the list of candidate cell IDs in response to a successful completion of the LTM cell switch.

2. The apparatus of claim 1, wherein to obtain TAs for the one or more LTM candidate cells, the at least one processor is configured to:

receive, from the serving gNB-DU, a Physical Downlink Control Channel (PDCCH) order to perform uplink synchronization with at least one LTM candidate cell of at least one candidate gNB-DU, wherein the PDCCH order includes a physical cell ID (PCI) of the at least one LTM candidate cell being served by the at least one candidate gNB-DU;

transmit a Random Access Channel (RACH) preamble in a RACH Request message to the at least one candidate gNB-DU serving the at least one LTM candidate cell;

receive a Random Access Response including a TA of the at least one LTM candidate cell either directly from the at least one candidate gNB-DU or via the serving gNB-DU; and store the TA of the at least one LTM candidate cell based on TA alignment timer.

3. The apparatus of claim 1, wherein in response to receipt of the LTM cell switch command to switch from the current serving cell to the target cell, the at least one processor is configured to:

perform, periodically, an intra-frequency L1 measurement for at least one LTM candidate cell;

transmit an intra-frequency L1 measurement report of the at least one LTM candidate cell to the serving gNB-DU;

receive the LTM cell switch command from the serving gNB-DU based on the intra-frequency L1 measurement report, wherein the LTM cell switch command at least includes a physical cell ID (PCI) of the target cell and beam information of the target cell; and perform the LTM cell switch from the current serving cell to the target cell based on the LTM cell switch command.

4. The apparatus of claim 1, wherein to transmit the list of candidate cell IDs and the stored TAs corresponding to the list of candidate cell IDs, the at least one processor is configured to:

transmit, an uplink (UL) Media Access Control (MAC) control element (CE) or a similar L1/L2 command including the list of candidate cell IDs and the stored TAs corresponding to the list of candidate cell IDs, to the target gNB-DU.

5. The apparatus of claim 1, wherein the at least one processor is configured to:

transmit, an uplink (UL) Media Access Control (MAC0 control element (CE) or a similar L1/L2 command including the list of candidate cell IDs and the stored TAs corresponding to the list of candidate cell IDs, to the serving gNB-DU.

6. The apparatus of claim 1, wherein the at least one processor is configured to:

transmit a Layer 3 (L3) Radio Resource Control (RRC) measurement report to a gNB-Control Unit (CU); and receive an RRC reconfiguration message including configuration of at least one candidate cell from the gNB-CU.

7. The apparatus of claim 1, wherein the serving gNB-DU and the target gNB-DU belong to one of: a different gNB or a same gNB.

8. A method comprising:

obtaining, by a User Equipment (UE), timing advances (TAs) for one or more Layer (L1/L2) Triggered Mobility (LTM) candidate cells based on an indication from a serving gNodeB Distributed Unit (gNB-DU) and storing the obtained TAs;

receiving, by the UE, an LTM cell switch command to perform an LTM cell switch from a current serving cell to a target cell, wherein the current serving cell is served by the serving gNB-DU and the target cell is served by a target gNB-DU; and transmitting, by the UE to the target gNB-DU serving the target cell, a list of candidate cell IDs and the stored TAs corresponding to the list of candidate cell IDs in response to a successful completion of the LTM cell switch.

9. The method of claim 8, wherein the obtaining the TAs for the one or more LTM candidate cells includes:

receiving, from the serving gNB-DU, a Physical Downlink Control Channel (PDCCH) order for performing uplink synchronization with at least one LTM candidate cell of at least one candidate gNB-DU, wherein the PDCCH order includes a physical cell ID (PCI) of the at least one LTM candidate cell being served by the at least one candidate gNB-DU;

transmitting a Random Access Channel (RACH) preamble to the at least one candidate gNB-DU for the at least one LTM candidate cell;

receiving a Random Access Response including a TA of the at least one LTM candidate cell either directly from the at least one candidate gNB-DU or via the serving gNB-DU; and storing the TA of the at least one LTM candidate cell based on TA alignment timer.

10. The method of claim 8, wherein in response to receiving the LTM cell switch command to switch from the current serving cell to the target cell, the method comprises:

performing, periodically, an intra-frequency L1 measurement for at least one LTM candidate cell;

transmitting an intra-frequency L1 measurement report of the at least one LTM candidate cell to the serving gNB-DU;

receiving the LTM cell switch command from the serving gNB-DU based on the intra-frequency L1 measurement report, wherein the LTM cell switch command at least includes a physical cell ID (PCI) of the target cell and beam information of the target cell; and performing the LTM cell switch from the current serving cell to the target cell based on the LTM cell switch command.

11. The method of claim 8, wherein the transmitting the list of candidate cell IDs and the stored TAs corresponding to the list of candidate cell IDs includes:

transmitting, an uplink (UL) Media Access Control (MAC) control element (CE) including the list of candidate cell IDs and the stored TAs corresponding to the list of candidate cell IDs, to the target gNB-DU.

12. The method of claim 8, further comprising:

transmitting, an uplink (UL) Media Access Control (MAC) control element (CE) or a similar L1/L2 command including the list of candidate cell IDs and the stored TAs corresponding to the list of candidate cell IDs, to the serving gNB-DU.

13. The method of claim 8, further comprising:

transmitting a Layer 3 (L3) Radio Resource Control (RRC) measurement report to a gNB-Control Unit (CU); and receiving an RRC reconfiguration message including configuration of at least one candidate cell from the gNB-CU.

14. The method of claim 8, wherein the serving the current serving cell by the serving gNB-DU and the serving the target cell by the target gNB-DU includes one of providing a same gNB for the serving gNB-DU and the target gNB-DU, or providing a first gNB for the serving gNB-DU and a second gNB for the target gNB-DU, wherein the first gNB is different than the second gNB.

15. A non-transitory computer-readable medium having computer-readable instructions that when executed by a processor causes the processor to perform operations of:

obtaining, by a User Equipment (UE), timing advances (TAs) for one or more Layer (L1/L2) Triggered Mobility (LTM) candidate cells based on an indication from a serving gNodeB Distributed Unit (gNB-DU) and storing the obtained TAs;

obtaining, by the UE, an LTM cell switch command to perform an LTM cell switch from a current serving cell to a target cell, wherein the current serving cell is served by the serving gNB-DU and the target cell is served by a target gNB-DU; and transmitting, by the UE to the target gNB-DU serving the target cell, a list of candidate cell IDs and the stored TAs corresponding to the list of candidate cell IDs, to the target gNB-DU serving the target cell, in response to a successful completion of the LTM cell switch.

16. The non-transitory computer-readable medium of claim 15, wherein the obtaining the TAs for the one or more LTM candidate cells includes:

receiving, from the serving gNB-DU, a Physical Downlink Control Channel (PDCCH) order for performing uplink synchronization with at least one LTM candidate cell of at least one candidate gNB-DU, wherein the PDCCH order includes a physical cell ID (PCI) of the at least one LTM candidate cell being served by the at least one candidate gNB-DU;

transmitting a Random Access Channel (RACH) preamble to the at least one candidate gNB-DU for the at least one LTM candidate cell;

receiving a Random Access Response including a TA of the at least one LTM candidate cell either directly from the at least one candidate gNB-DU or via the serving gNB-DU; and storing the TA of the at least one LTM candidate cell based on TA alignment timer.

17. The non-transitory computer-readable medium of claim 15, wherein in response to receiving the LTM cell switch command to switch from the current serving cell to the target cell, the operations comprise:

performing, periodically, an intra-frequency L1 measurement for at least one LTM candidate cell;

transmitting an intra-frequency L1 measurement report of the at least one LTM candidate cell to the serving gNB-DU;

receiving the LTM cell switch command from the serving gNB-DU based on the intra-frequency L1 measurement report, wherein the LTM cell switch command at least includes a physical cell ID (PCI) of the target cell and beam information of the target cell; and performing the LTM cell switch from the current serving cell to the target cell based on the LTM cell switch command.

18. The non-transitory computer-readable medium of claim 15, wherein the transmitting the list of candidate cell IDs and the stored TAs corresponding to the list of candidate cell IDs includes:

transmitting, an uplink (UL) Media Access Control (MAC) control element (CE) including the list of candidate cell IDs and the stored TAs corresponding to the list of candidate cell IDs, to the target gNB-DU.

19. The non-transitory computer-readable medium of claim 15, further comprising:

transmitting, an uplink (UL) Media Access Control (MAC) control element (CE) or a similar L1/L2 command including the list of candidate cell IDs and the stored TAs corresponding to the list of candidate cell IDs, to the serving gNB-DU.

20. The non-transitory computer-readable medium of claim 15, further comprising:

transmitting a Layer 3 (L3) Radio Resource Control (RRC) measurement report to a gNB-Control Unit (CU); and receiving an RRC reconfiguration message including configuration of at least one candidate cell from the gNB-CU.

* * * * *